(12) United States Patent
Chen et al.

(10) Patent No.: US 10,738,613 B2
(45) Date of Patent: Aug. 11, 2020

(54) PAIRED AIR PRESSURE ENERGY POWER SYSTEM AND POWER METHOD THEREOF

(71) Applicants: Weilun Chen, Beijing (CN); Tailun Chen, Beijing (CN); Huiqin Li, Beijing (CN); Steve Jun Chen, Beijing (CN)

(72) Inventors: Weilun Chen, Beijing (CN); Tailun Chen, Beijing (CN); Huiqin Li, Beijing (CN); Steve Jun Chen, Beijing (CN)

(73) Assignees: Weilun Chen, Beijing (CN); Tailun Chen, Beijing (CN); Huiqin Li, Beijing (CN); Steve Jun Chen, Beijing (CN)

( * ) Notice: Subject to any disclaimer, the term of this patent is extended or adjusted under 35 U.S.C. 154(b) by 43 days.

(21) Appl. No.: 16/103,731

(22) Filed: Aug. 14, 2018

(65) Prior Publication Data
US 2018/0371908 A1 Dec. 27, 2018

Related U.S. Application Data

(63) Continuation of application No. PCT/CN2017/073459, filed on Feb. 14, 2017.

(30) Foreign Application Priority Data

Feb. 14, 2016 (CN) .......................... 2016 1 0084601

(51) Int. Cl.
*F03D 9/17* (2016.01)
*F01B 23/10* (2006.01)
(Continued)

(52) U.S. Cl.
CPC .............. *F01B 23/10* (2013.01); *F01B 17/02* (2013.01); *F01B 29/10* (2013.01); *F02C 6/16* (2013.01);
(Continued)

(58) Field of Classification Search
CPC ...... F01C 1/04; F01C 1/22; F01C 1/24; F01C 1/26
See application file for complete search history.

(56) References Cited

U.S. PATENT DOCUMENTS 658,556 A * 9/1900 Pitt ........................... F01C 1/32
418/61.1
3,827,835 A * 8/1974 Higuchi .................... F01C 1/22
418/56
(Continued)

FOREIGN PATENT DOCUMENTS

CN 101506469 A 8/2009
CN 101575986 A 11/2009
(Continued)

*Primary Examiner* — F Daniel Lopez
(74) *Attorney, Agent, or Firm* — Wayne & Ken, LLC; Tony Hom

(57) ABSTRACT

Disclosed is a paired compress gas energy power system and power method. The paired compress gas energy power system includes: a paired compress gas energy storage device having a high pressure air container and a low pressure air container, the high pressure air container is filled with a high pressure gas, the low pressure air container is filled with a low pressure gas; a paired compress gas energy engine, respectively connected to the low pressure air container and the high pressure air container; and a power device connected to the rotary shaft of the paired compress gas energy engine, the power device is driven by the paired compress gas energy engine. The invention converts the paired compress gas energy into the mechanical torque energy through the paired compress gas energy engine to drive the power device to work, or to drive the generator to generate electric energy.

19 Claims, 27 Drawing Sheets

(51) Int. Cl.
| | |
|---|---|
| *F17C 13/02* | (2006.01) |
| *F03B 13/18* | (2006.01) |
| *G05D 16/00* | (2006.01) |
| *G05D 16/10* | (2006.01) |
| *F04B 17/02* | (2006.01) |
| *F03D 9/28* | (2016.01) |
| *F17C 1/00* | (2006.01) |
| *F03B 17/06* | (2006.01) |
| *F03D 9/00* | (2016.01) |
| *F17C 13/12* | (2006.01) |
| *F04B 41/02* | (2006.01) |
| *F01B 17/02* | (2006.01) |
| *F01B 29/10* | (2006.01) |
| *F02C 6/16* | (2006.01) |
| *F03D 1/06* | (2006.01) |
| *F03D 1/02* | (2006.01) |
| *F15B 1/02* | (2006.01) |

(52) U.S. Cl.
CPC ........ *F03B 13/1815* (2013.01); *F03B 17/063* (2013.01); *F03D 9/008* (2013.01); *F03D 9/17* (2016.05); *F03D 9/28* (2016.05); *F04B 17/02* (2013.01); *F04B 41/02* (2013.01); *F17C 1/007* (2013.01); *F17C 13/025* (2013.01); *F17C 13/12* (2013.01); *G05D 16/028* (2019.01); *G05D 16/10* (2013.01); *F03D 1/025* (2013.01); *F03D 1/065* (2013.01); *F05B 2210/16* (2013.01); *F05B 2220/708* (2013.01); *F05B 2240/211* (2013.01); *F05B 2240/302* (2013.01); *F05B 2240/40* (2013.01); *F05B 2240/95* (2013.01); *F05B 2260/40* (2013.01); *F15B 1/024* (2013.01); *F17C 2201/0104* (2013.01); *F17C 2201/0109* (2013.01); *F17C 2201/054* (2013.01); *F17C 2203/0629* (2013.01); *F17C 2203/0631* (2013.01); *F17C 2205/0138* (2013.01); *F17C 2221/014* (2013.01); *F17C 2221/017* (2013.01); *F17C 2221/03* (2013.01); *F17C 2221/031* (2013.01); *F17C 2223/0123* (2013.01); *F17C 2223/033* (2013.01); *F17C 2223/035* (2013.01); *F17C 2223/036* (2013.01); *F17C 2223/038* (2013.01); *F17C 2225/0123* (2013.01); *F17C 2225/033* (2013.01); *F17C 2225/035* (2013.01); *F17C 2225/036* (2013.01); *F17C 2225/038* (2013.01); *F17C 2227/0157* (2013.01); *F17C 2250/0434* (2013.01); *F17C 2260/042* (2013.01); *F17C 2270/0121* (2013.01); *F17C 2270/0147* (2013.01); *F17C 2270/0581* (2013.01)

(56) References Cited

U.S. PATENT DOCUMENTS

| | | | | |
|---|---|---|---|---|
| 4,206,608 | A | 6/1980 | Bell | |
| 4,462,774 | A * | 7/1984 | Hotine | F01C 1/104 418/61.3 |
| 4,760,701 | A * | 8/1988 | David | F01B 3/0079 123/228 |
| 5,431,551 | A * | 7/1995 | Aquino | F01C 1/22 418/113 |
| 7,117,840 | B2 * | 10/2006 | Schapiro | F01C 1/08 123/204 |
| 7,281,513 | B1 * | 10/2007 | Webb | F01C 1/22 123/200 |
| 8,523,546 | B2 * | 9/2013 | Shkolnik | F01C 19/08 418/61.2 |
| 2014/0353978 | A1 * | 12/2014 | Madson | F03D 9/17 290/55 |
| 2015/0091301 | A1 * | 4/2015 | Littmann | F02C 6/16 290/7 |
| 2018/0094581 | A1 * | 4/2018 | Teixeira | F03D 9/17 |

FOREIGN PATENT DOCUMENTS

| | | |
|---|---|---|
| CN | 104854344 A | 8/2015 |
| CN | 105299945 A | 2/2016 |

* cited by examiner

PAIRED AIR PRESSURE ENERGY POWER SYSTEM AND POWER METHOD THEREOF

CROSS-REFERENCE TO RELATED APPLICATIONS

This application is a continuation of International Application No. PCT/CN2017/073459 with a filing date of Feb. 14, 2017, designating the United States, now pending, and further claims priority to Chinese application no. 201610084601.4 with a filing date of Feb. 14, 2016. The content of the aforementioned applications, including any intervening amendments thereto, are incorporated herein by reference.

TECHNICAL FIELD

The invention relates to a gas energy power system and a power method, and more particularly, to a paired compress gas energy power system and a power method in the field of gas energy applications.

BACKGROUND OF THE INVENTION

With the development of human civilization from industrial civilization to ecological civilization, human beings have increasingly strengthened their protection of the global environment. The development and utilization of renewable, low-emission and even zero emission eco-friendly power methods have been highly valued and sustained.

In the early days of industrial civilization, it was the era of steam engine. In the 19th century, due to the utilization of energy and the demand for power efficiency, the steam engine developed to the extreme was permanently replaced by the internal combustion engine, and the second power revolution occurred. Up to now, the internal combustion engine is also a mainstream power method highly industrialized with highly improved energy efficiency utilization, and has made an epoch-making contribution to the development of human industrial civilization.

However, both steam engine and internal combustion engine naturally have problems such as low energy efficiency and large emissions of environmentally unfriendly substances.

BRIEF DESCRIPTION OF THE INVENTION

The present invention is to provide a paired compress gas energy power system that produces mechanical energy by converting paired compress gas energy, by means of a paired compress gas energy engine, into a mechanical torque to generate rotational energy, so as to drive a power device to operate.

The present invention is further to provide a paired compress gas energy power method, which uses paired compress gas energy as a basic energy source for a thermal function circulation system and produces mechanical energy by converting paired compress gas energy into a mechanical torque to generate rotational energy, so as to drive a power device to operate.

The present invention provides a paired compress gas energy power system. The system includes:

a paired compress gas energy storage device having a high pressure air container and a high pressure air container, where the high pressure air container is filled with a high pressure gas, the low pressure air container is filled with a low pressure gas, and the paired compress gas energy storage device has paired compress gas energy;

a paired compress gas energy engine, connected to the low pressure air container and the high pressure air container respectively, the high pressure gas within the high pressure air container flows through the paired compress gas energy engine into the low pressure air container so as to drive a rotary shaft of the paired compress gas energy engine to rotate forwardly; and a power device connected to the rotary shaft of the paired compress gas energy engine, where the power device is driven by the paired compress gas energy engine through the rotary shaft, the power device drives the rotary shaft and the paired compress gas energy engine to rotate reversely under the action of an external force, such that the the low pressure gas within the low pressure air container flows through the paired compress gas energy engine and is compressed into the high pressure air container to become the high pressure gas.

The present invention further provides a paired compress gas energy power method, including the steps of: providing a high pressure air container filled with a high pressure gas and a low pressure air container filled with a low pressure gas, there is a paired compress gas energy between the low pressure air container and the high pressure air container; the power device is driven during the high pressure gas within the high pressure air container flowing into the low pressure air container to be the low pressure gas, and the power device compresses the low pressure gas with the low pressure air container into the high pressure air container to be the high pressure gas under the action of an external force, and the paired compress gas energy is released to drive the external power device in an isothermal and isovolumetric thermal cycle work mode.

The invention has the following beneficial effects: the work process of a gas working medium of the paired compress gas energy power system is an isothermal and isovolumetric thermal motion process, which has the remarkable features as follows: zero emission of working medium, high energy conversion efficiency, simple structures of mechanism operation parts; improved reliability of the pneumatic system and reduced maintenance costs for the operation process. The invention can use traditional, renewable energy sources, has higher utilization of energy efficiency, volume, space and time and necessary resources, achieves zero net emissions of non-environmentally friendly substances in the full power cycle, has lower overall costs of construction, operation and maintenance, and exhibits the greatest inheritance to the existing power industrial chain and process materials and the smallest transition in technology.

BRIEF DESCRIPTION OF THE DRAWINGS

The embodiments of the present invention are further described below in conjunction with the accompanying drawings.

DETAILED DESCRIPTION

The technical solutions in the embodiments of the present invention are clearly and completely described in the following with reference to the accompanying drawings in the embodiments of the present invention. It is obvious that the described embodiments are only a part of the embodiments of the present invention, but not all embodiments. All other embodiments obtained by those of ordinary skill in the art based on the embodiments of the present invention without creative efforts are within the scope of protection of the present invention.

All the following embodiments are described with reference to FIGS. 1 to 27.

Figure 1:
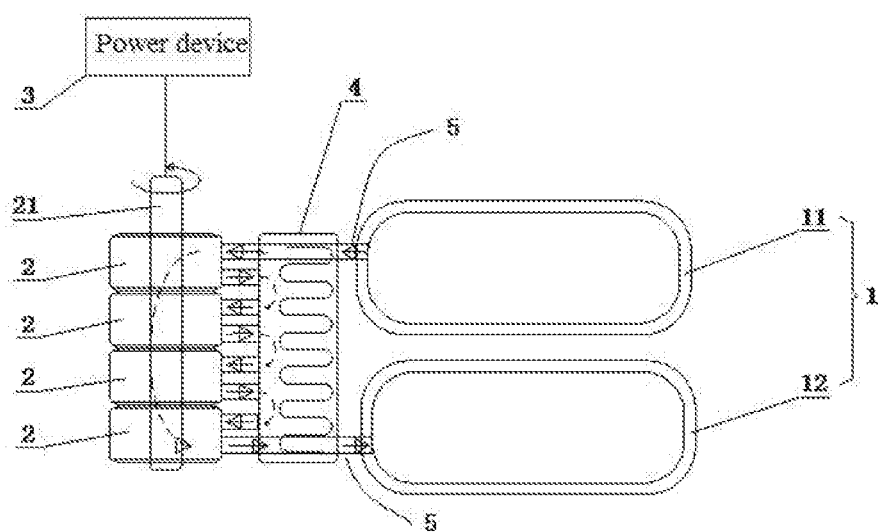
FIG. 1 is a schematic view showing the structure of the paired compress gas energy power system of the present invention.

As shown in FIG. 1, the present invention provides a paired compress gas energy power system including a paired compress gas energy storage device 1, a paired compress gas energy engine 2 and a power device 3, wherein the paired compress gas energy storage device 1 has a high pressure air container 11 and a low pressure air container 12, the high pressure air container 11 is filled with a high pressure gas, the low pressure air container 12 is filled with a low pressure gas, the paired compress gas energy storage device 1 stores paired compress gas energy; the paired compress gas energy engine 2 is connected to the low pressure air container 12 and the high pressure air container 11 respectively, the high pressure gas within the high pressure air container 11 flows through the paired compress gas energy engine 2 into the low pressure air container 12 so as to drive a rotary shaft 21 of the paired compress gas energy engine 2 to rotate forwardly; a power device 3 is connected to the rotary shaft 21 of the paired compress gas energy engine 2, and the power device 3 is driven by the paired compress gas energy engine 2 by means of the rotary shaft 21;

Under the action of an external force, the power device 3 drives the rotary shaft 21 to rotate reversely and drive the paired compress gas energy engine 2 to rotate reversely, to enable the low pressure gas within the low pressure air container 12 to flow through the paired compress gas energy engine 2 and be compressed into the high pressure air container 11 to become high pressure gas.

In a possible embodiment, the high pressure air container 11 includes at least one closed cylinder filled with a high pressure gas, and the low pressure air container 12 includes at least one closed cylinder filled with a low pressure gas.

Figure 2:
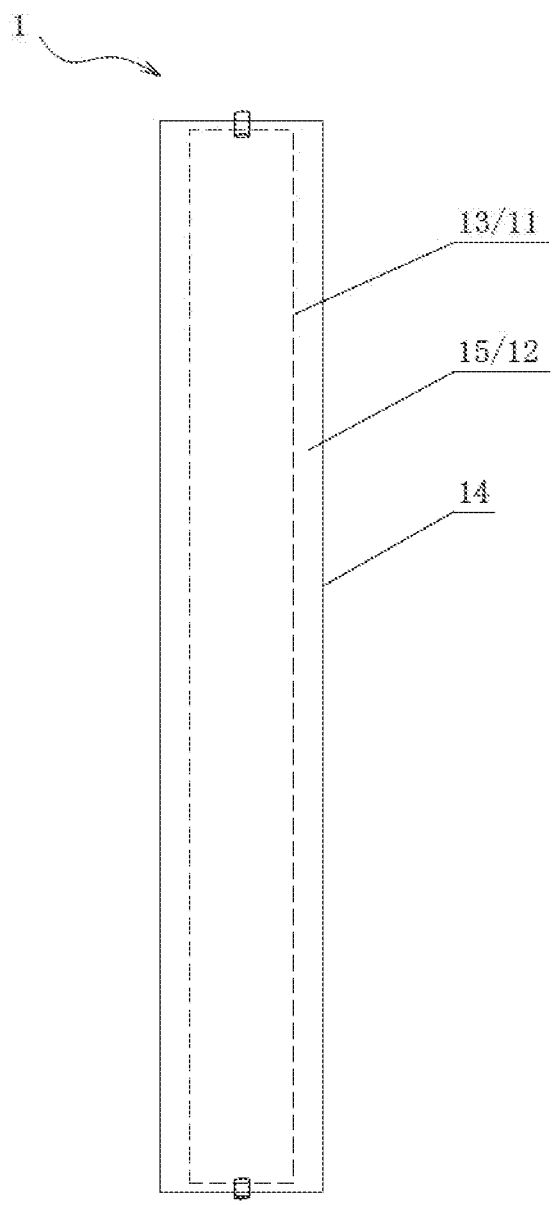
FIG. 2 is a schematic view showing the structure of an optional embodiment of the paired compress gas energy storage device of the present invention.

In another possible embodiment, as shown in FIG. 2, the paired compress gas energy storage device 1 includes an inner body 13 and an outer body 14 sleeved outside the inner body 13, the inner body 13 is filled with a first gas, a cavity 15 formed between the outer body 14 and the inner body 13 is filled with a second gas, the first gas and the second gas have a gas pressure difference therebetween, and the gas pressure difference is the paired compress gas energy. In a specific embodiment, the inner body 13 may be the high pressure air container 11, the first gas within the inner body 13 is a high pressure gas, the cavity 15 is the low pressure air container 12, and the second gas within the cavity 15 is a low pressure gas; or, in another specific embodiment, the inner body 13 is the low pressure air container 12, the first gas within the inner body 13 is a low pressure gas, the cavity 15 is the high pressure air container 11, and the second gas within the inner cavity 15 is a high pressure gas. Wherein, when the paired compress gas energy storage device 1 is located on the ground, the inner body 13 at this time is the high pressure air container 11, the cavity 15 is the low pressure air container 12; when the paired compress gas energy storage device 1 is located underwater or underground, as the underwater or underground pressure environment is a high pressure environment, the inner body 13 at this time is the low pressure air container 12, and the cavity 15 is the high pressure air container 11, which is beneficial for reducing the stress on walls of the outer body 14 and counteracting the contraction pressure of the outer body 14.

In the present invention, the intensity of pressure of the high pressure gas is stronger than the intensity of pressure of the low pressure gas, and the gas energy pressure difference between the high pressure gas and the low pressure gas is the paired compress gas energy. The intensity of pressure of the high pressure gas may be 0.1 MPa to 100 MPa, and the intensity of pressure of the low pressure gas may be 100 Pa to 30 MPa. Further, the high pressure gas and the low pressure gas may be selected from gas, or nitrogen, or helium, or a mixture of other gases; and the mixture of other gases may be, for example, a mixture of nitrogen and helium.

According to an embodiment of the present invention, as shown in FIG. 1, in a possible embodiment, there may be a plurality of paired compress gas energy engines 2, and the plurality of paired compress gas energy engines 2 are connected in series between the power device 3 and the paired compress gas energy storage device 1, for example, two, three or more paired compress gas energy engines 2 can be connected between the power device 3 and the paired compress gas energy storage device 1 according to actual needs, which is not limited herein. Of course, in another possible embodiment, only one paired compress gas energy engine 2 may be connected between the power device 3 and the paired compress gas energy storage device 1.

According to an embodiment of the present invention, a regenerator 4 is connected between the paired compress gas energy engine 2 and the paired compress gas energy storage device 1, and the regenerator 4 is used for performing cooling and heating energy exchange between the gas flowing out of the high pressure air container 11 and the gas flowing into the low pressure air container 12.

Specifically, the regenerator 4 may be provided therein with two ducts wound in a serpentine or spiral shape, wherein the high pressure gas flows into one duct and the low pressure gas flows into the other duct, such that the heat in each duct can be exchanged with each other by means of the two ducts of which the outer surfaces are in contact with each other, that is, the cooling energy generated when the gas is emitted from the high pressure air container 11 is exchanged with the heating energy generated when the gas is compressed into the low pressure air container 12, such that during gas release and expansion, the overall cooling energy and heating energy are compensated in a balanced manner in the regenerator 4 and counteracted.

Therefore, the work process of the paired compress gas energy power system of the present invention is as follows: the high pressure gas within the high pressure air container 11 of the paired compress gas energy storage device 1 flows into the paired compress gas energy engine 2 through the regenerator 4, thereby causing the rotary shaft 21 of the paired compress gas energy engine 2 to rotate to drive the power device 3 to operate; after the high pressure gas within the paired compress gas energy engine 2 works, the intensity of pressure of the gas is lowered, and then the gas is emitted into the low pressure air container 12 of the paired compress gas energy storage device 1. The above process can be continued until the gas pressure in the high pressure air container 11 is equal to the gas pressure in the low pressure air container 12, that is, the pressure difference between the gas within the high pressure air container 11 and the gas within the low pressure air container 12 is equal to zero.

The work process of the closed gas working medium of the paired compress gas energy power system of the invention is an isovolumetric and isothermal thermal motion process, which has the following remarkable features: zero emission of working medium, high energy conversion efficiency, simple structures of mechanism operation parts, improved reliability of the pneumatic system, no consumables, and reduced maintenance costs for the operation process.

Figure 3:
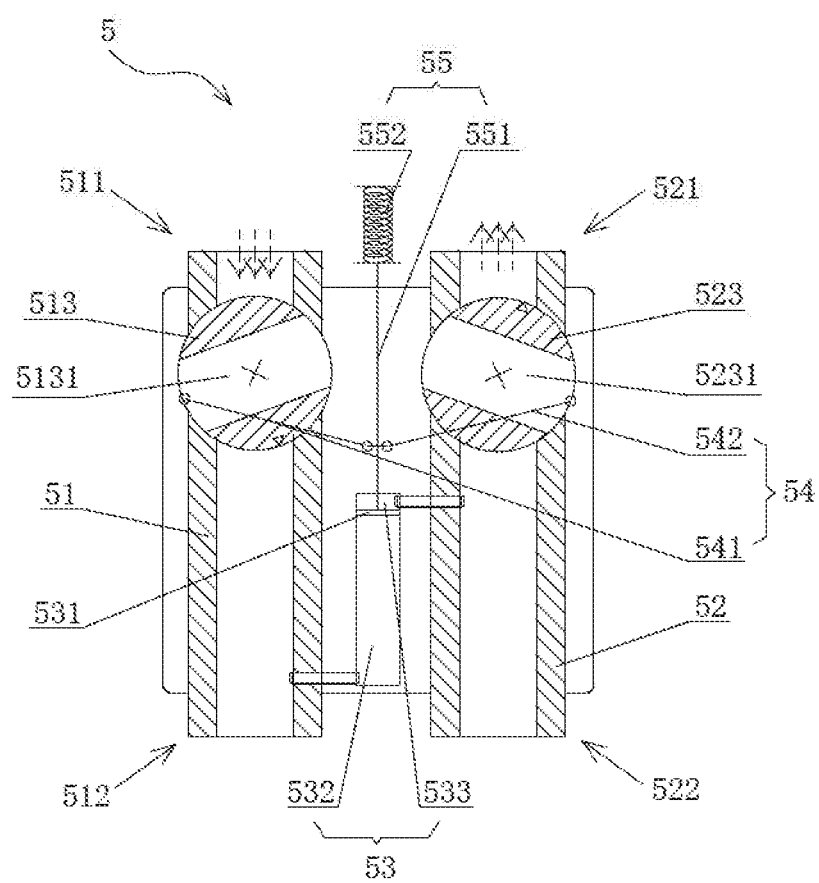
FIGS. 3 to 5 are schematic views showing the structure of an optional embodiment of the paired compress gas energy differential rotor stabilizer valve of the present invention.
Figure 7:
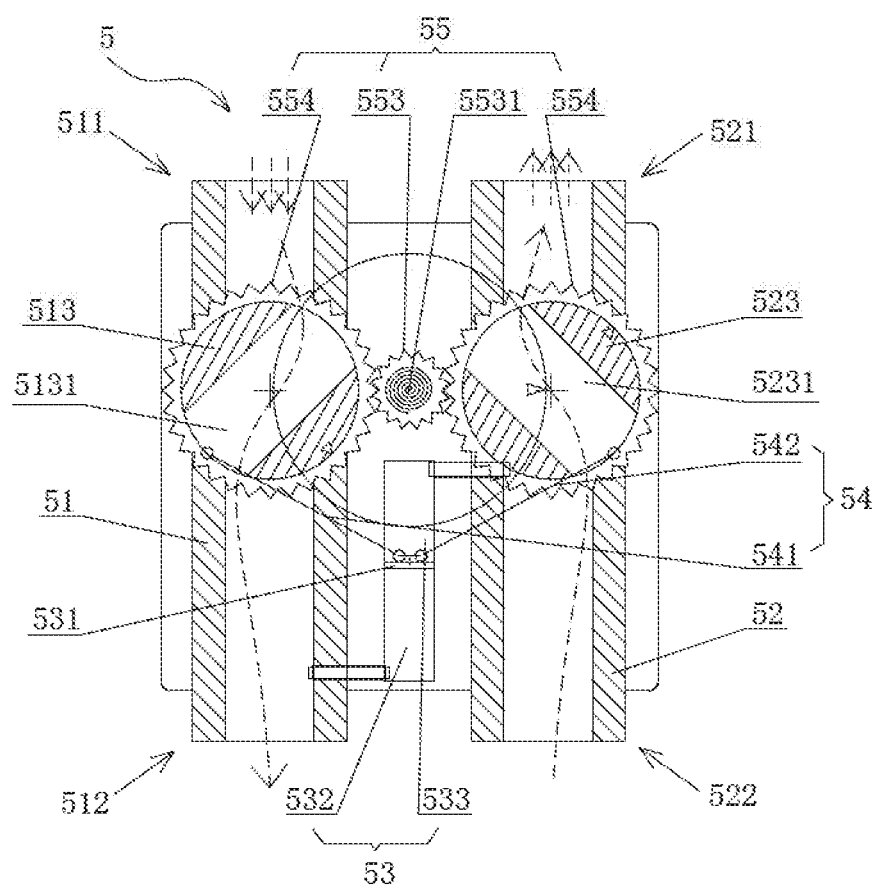

As shown in FIGS. 1, 3 and 7, according to an embodiment of the present invention, a paired compress gas energy differential rotor stabilizer valve 5 for enabling the pressure difference of the gas flowing through the paired compress gas energy engine to maintain stable, is provided between the regenerator 4 and the paired compress gas energy storage device 1, and the paired compress gas energy differential rotor stabilizer valve 5 is used for reducing the pressure of the inlet gas source of the low pressure air container 12 to a certain desired outlet gas source pressure, and automatically stabilizing the outlet gas source pressure of the high pressure air container 11 by relying on the energy of the gas source working medium itself. That is, the paired compress gas energy differential rotor stabilizer valve 5 is used for reducing the pressure of the gas source flowing out of the paired compress gas energy engine 2 to the inlet gas source pressure of the low pressure air container 12, reducing the pressure of the outlet gas source flowing out of the high pressure air container 11 to a desired inlet gas source pressure of the paired compress gas energy engine 2, and automatically stabilizing the pressure difference between the inlet and outlet gas working medium of the paired compress gas energy engine 2 by relying on the pressure difference of the gas working medium itself of the paired compress gas energy engine 2 and a spring 552 or a torsion spring 5531 in the paired compress gas energy differential rotor stabilizer valve 5.

Specifically, as shown in FIG. 3, the paired compress gas energy differential rotor stabilizer valve 5 includes a first duct 51, a second duct 52, a differential cylinder 53 and a linkage mechanism 54, wherein one end of the first duct 51 connected to the high pressure air container 11 is a first duct intake end 511, and the other end of the first duct 51 connected to the paired compress gas energy engine 2 is a first duct exhaust end 512, a rotatable first rotor gas valve 513 is provided within the first duct intake end 511, and the first rotor gas valve 513 has a first rotor gas valve passage 5131; an end of the second duct 52 connected to the low pressure air container 12 is a second duct exhaust end 521, and the other end of the second duct 52 connected to the paired compress gas energy engine 2 is a second duct intake end 522, a rotatable second rotor gas valve 523 is provided within the second duct exhaust end 521, and the second rotor gas valve 523 has a second rotor gas valve passage 5231; the differential cylinder 53 is connected between the first duct exhaust end 512 and the second duct intake end 522, a movable differential piston 531 is provided within the differential cylinder 53, and the differential cylinder 53 is divided into a first cylinder 532 and a second cylinder 533 by a differential piston 531, the first cylinder 532 being in communication with the first duct 51, the second cylinder 533 being in communication with the second duct 52; the linkage mechanism 54 is connected to the differential piston 531, and the differential piston 531 moves to drive, by means of the linkage mechanism 54, the first rotor gas valve 513 and the second rotor gas valve 523 to rotate.

Further, the paired compress gas energy differential rotor stabilizer valve 5 further includes a driving mechanism 55 that can drive the differential piston 531 to move within the differential cylinder 53.

Figure 4:
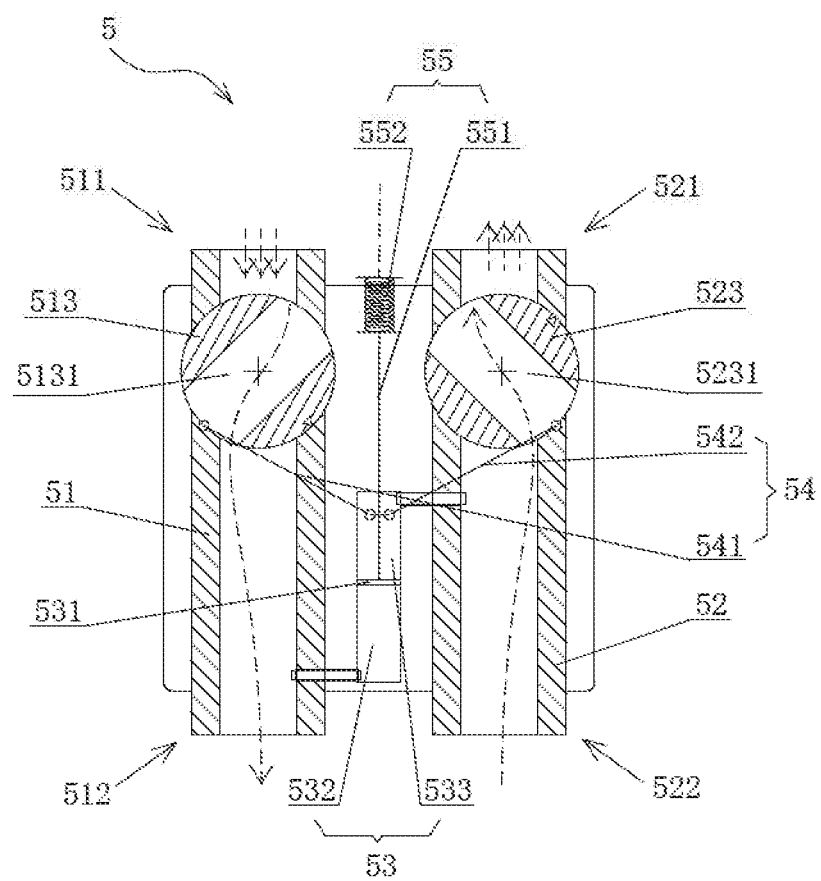
Figure 5:
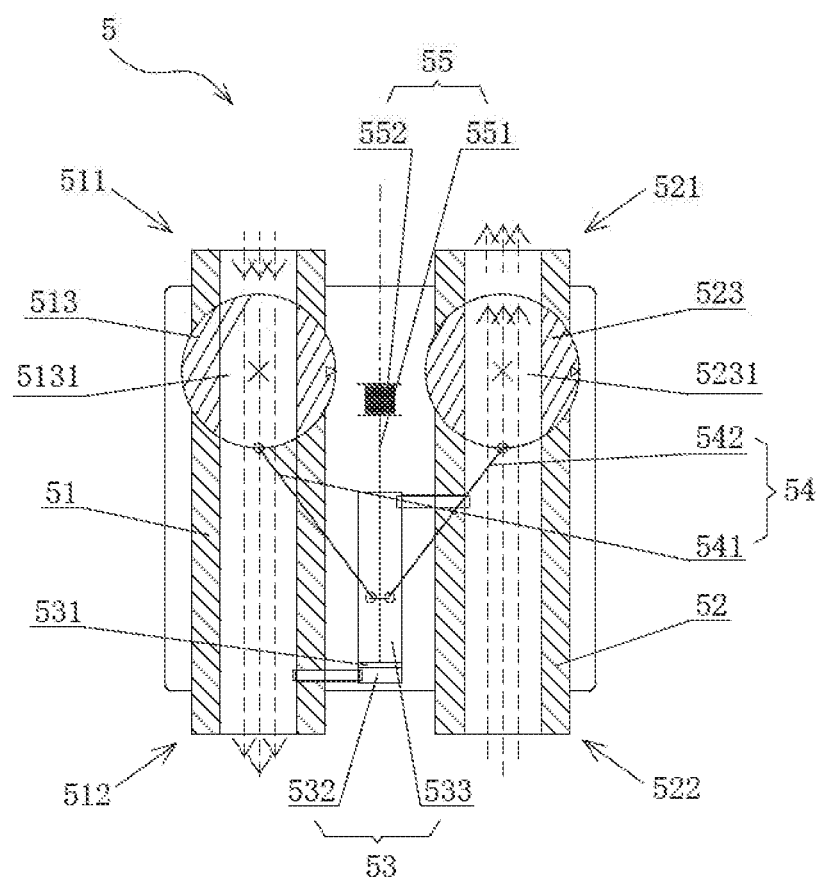

In a possible embodiment of the driving mechanism 55, as shown in FIGS. 3 to 5, the driving mechanism 55 includes a connecting rod 551 and a spring 552, one end of the connecting rod 551 being connected to a spring 552 and the other end of the connecting rod 551 being connected to the differential piston 531; the linkage mechanism 54 includes a first linkage rod 541 and a second linkage rod 542, the both ends of the first linkage rod 541 being rotatably connected to the connecting rod 551 and the first rotor gas valve 513, respectively, and the both ends of the linkage rod 542 being rotatably connected to the connecting rod 551 and the second rotor gas valve 523, respectively.

The work process of the paired compress gas energy differential rotor stabilizer valve 5 in this embodiment is as follows:

As shown in FIG. 3, when the differential piston 531 is located at one end of the differential cylinder 53, the first rotor gas valve 513 and the second rotor gas valve 523 are in a state of closing the first duct 51 and the second duct 52, the high pressure air container 11 is not in communication with the first duct 51, the low pressure air container 12 is not in communication with the second duct 52, the paired compress gas energy differential rotor stabilizer valve 5 is in an no-output state, and the spring 552 is in a relaxed state;

As shown in FIG. 4, when the spring 552 pushes the connecting rod 551 under the action of an external force (such as a pedaling motion), that is, the connecting rod 551 drives the differential piston 531 to move from one end of the differential cylinder 53 to the other end of the differential cylinder 53, the first rotor gas valve 513 and the second rotor gas valve 523 are rotated along with the movement of the differential piston 531 under the action of the linkage mechanism 54, so that the first rotor gas valve passage 5131 of the first rotor gas valve 513 is gradually rotated to communicate with the first duct 51, and the second rotor gas valve passage 5231 of the second rotor gas valve 523 is gradually rotated to communicate with the second duct 52, that is, when the first rotor gas valve passage 5131 is in communication with the first duct 51, the second rotor gas valve passage 5231 is simultaneously in communication with the second duct 52, at this time, the high pressure air container 11 communicates with the first duct 51, and the low pressure air container 12 communicates with the second duct 52. In this state, as the first duct exhaust end 512 communicates with the first cylinder 532 of the differential cylinder 53, the high pressure gas flowing into the first duct 51 from the high pressure air container 11 flows into the first cylinder 532; in addition, as the second duct intake end 522 is in communication with the second cylinder 533 of the differential cylinder 53, the gas flowing into the second duct 52 from the paired compress gas energy engine 2 flows into the second cylinder 533, the two sides of the movable piston 531 are respectively subjected to the gas flow of different pressures, and in order to maintain pressure balance, the differential piston 531 automatically moves within the differential cylinder 53 and stops moving until a balance is obtained between the pressure applied to the spring 552 and the differential pressure applied to the differential piston 531.

When the amplitude of the fluctuation of the gas pressure of the first duct exhaust end 512 or the gas pressure of the second duct intake end 522 increases, leading to an increased pressure difference between the first cylinder 532 and the second cylinder 533 of the differential cylinder 53, at this time, the differential piston 531 moves in the direction toward the second cylinder 533 by sensing that the differential pushing force is greater than the elasticity of the spring 552, thereby causing the first rotor gas valve 513 and the second rotor gas valve 523 to rotate toward a direction to close the first duct 51 and the second duct 52 by means of he linkage mechanism 54. This negative feedback acts such that the gas pressure at the first duct exhaust end 512 and the gas pressure at the second duct intake end 522 tend to decrease at the same time, until a balance is obtained between the pressure applied to the spring 552 and the differential pressure applied to the differential piston 531 and the differential piston 531 stops moving, so that the pressure of the gas returns to its original value.

When the amplitude of the fluctuation of the gas pressure of the first duct exhaust end 512 or the gas pressure of the second duct intake end 522 decreases, leading to a reduced pressure difference between the first cylinder 532 and the second cylinder 533 of the differential cylinder 53, the differential piston 531 moves in the direction toward the first cylinder 532 by sensing that the differential pushing force is less than the elasticity of the spring 552, thereby causing the first rotor gas valve 513 and the second rotor gas valve 523 to rotate toward a direction to open the first duct 51 and the second duct 52 by means of he linkage mechanism 54. This negative feedback acts such that the gas pressure at the first duct exhaust end 512 and the gas pressure at the second duct intake end 522 tend to increase at the same time, until a balance is obtained between the pressure applied to the spring 552 and the differential pressure applied to the differential piston 531 and the differential piston 531 stops moving, so that the pressure of the gas returns to its original value.

As shown in FIG. 5, at this time, the paired compress gas energy differential rotor stabilizer valve 5 is in a maximum-output state.

Figure 6:
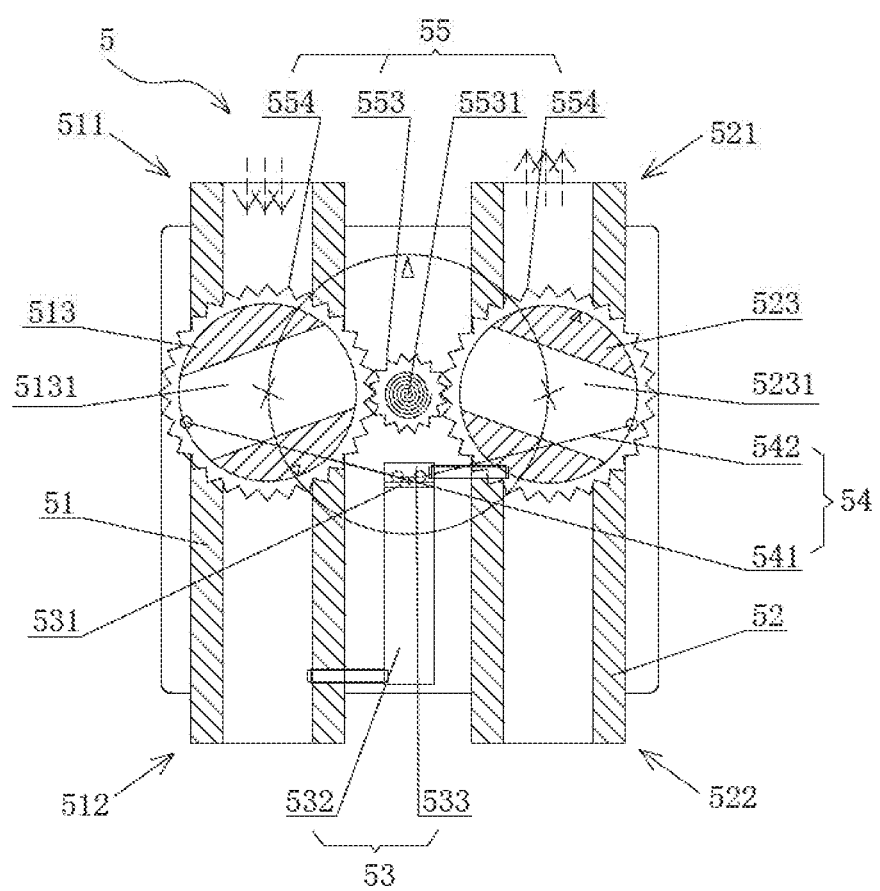
FIGS. 6 to 8 are schematic views showing the structure of another optional embodiment of the paired compress gas energy differential rotor stabilizer valve of the present invention.
Figure 8:
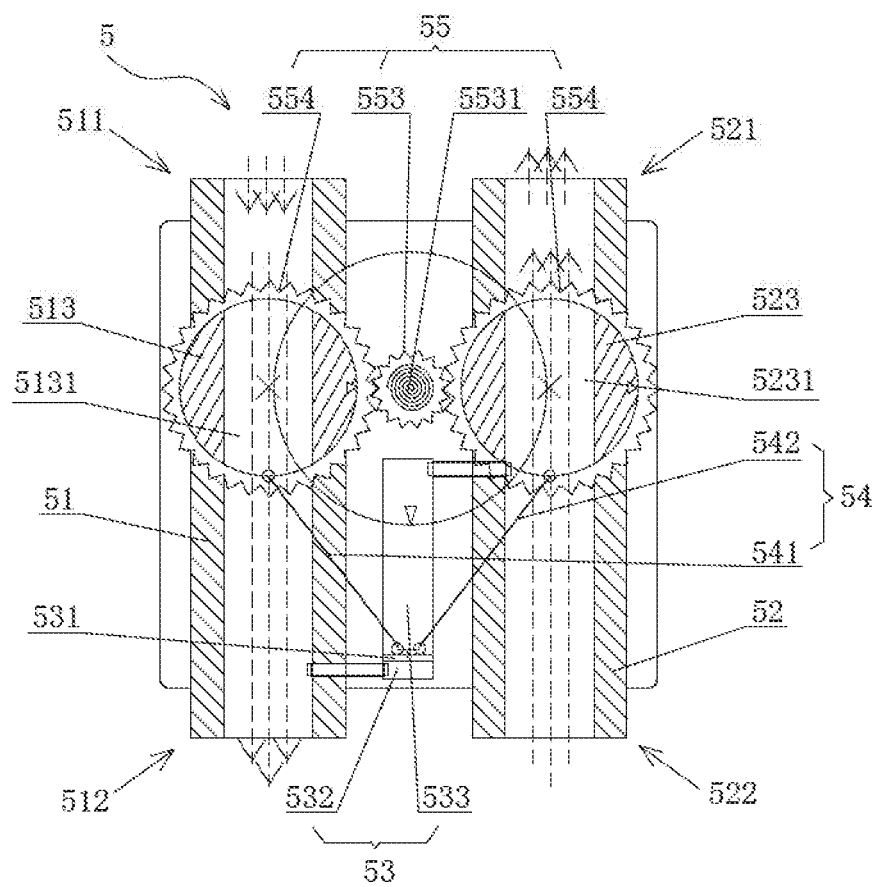

In another possible embodiment of the driving mechanism 55, as shown in FIG. 6 to FIG. 8, the driving mechanism 55 includes a driving gear 553 and two driven gears 554 respectively engaging with the driving gear 553, the two driven gears 554 are respectively connected to the first rotor gas valve 513 and the second rotor gas valve 523, the driving gear 553 is provided therein with a torsion spring 5531; the linkage mechanism 54 includes a first linkage rod 541 and a second linkage rod 542, the both ends of the first linkage rod 541 are respectively rotatably connected to the first rotor gas valve 513 and the differential piston 531, and the both ends of the second linkage rod 542 are rotatably connected to the second rotor gas valve 523 and the differential piston 531, respectively.

The work process of the paired compress gas energy differential rotor stabilizer valve 5 in this embodiment is similar to the work process of the paired compress gas energy differential rotor stabilizer valve 5 in the above-described feasible embodiment, and will not be described herein. In this embodiment, when an external force drives the differential piston 531, the movement of the differential piston 531 is such that the driving gear 553 is rotated so as to respectively drive the two driven gears 554 connected to the first rotor gas valve 513 and the second rotor gas valve 523 to rotate and drive, by means of the first linkage rod 541 and the second linkage rod 542, the differential piston 531 to move according to the rotation of the first rotor gas valve 513 and the second rotor gas valve 523. When the gas pressure of the first duct exhaust end 512 or the gas pressure of the second duct intake end 522 fluctuates, the rotation of the first rotor gas valve 513 and the rotation of the second rotor gas valve 523 are achieved by the differential piston 531 driving the linkage mechanism 54.

According to an embodiment of the present invention, the paired compress gas energy engine 2 is a triangular rotary piston pneumatic compressor or engine having a cylinder body 22 and a rotatable triangular rotary piston 23 provided within the cylinder body 22, the cross section of the triangular rotary piston 23 is triangular, and the cylinder body 22 is provided with gas ports for a plurality of inlets and outlets connected to the paired compress gas energy storage device 1.

Figure 9:
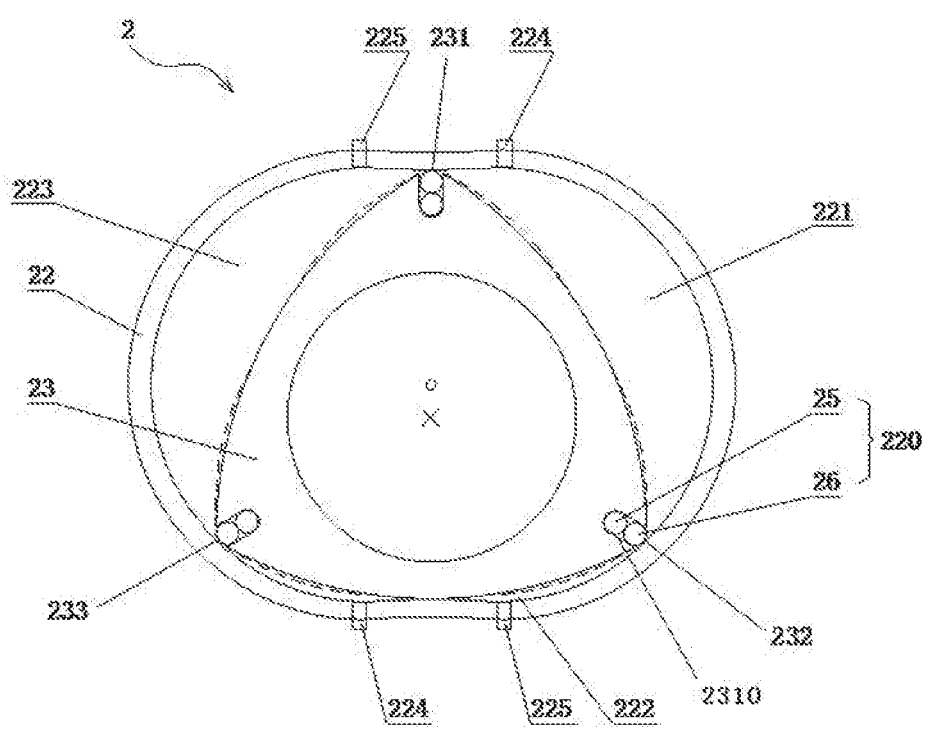
FIG. 9 is a schematic view showing the structure of an optional embodiment of the paired compress gas energy engine (i.e., a triangular rotary piston pneumatic compressor or engine) of the present invention.
Figure 10:
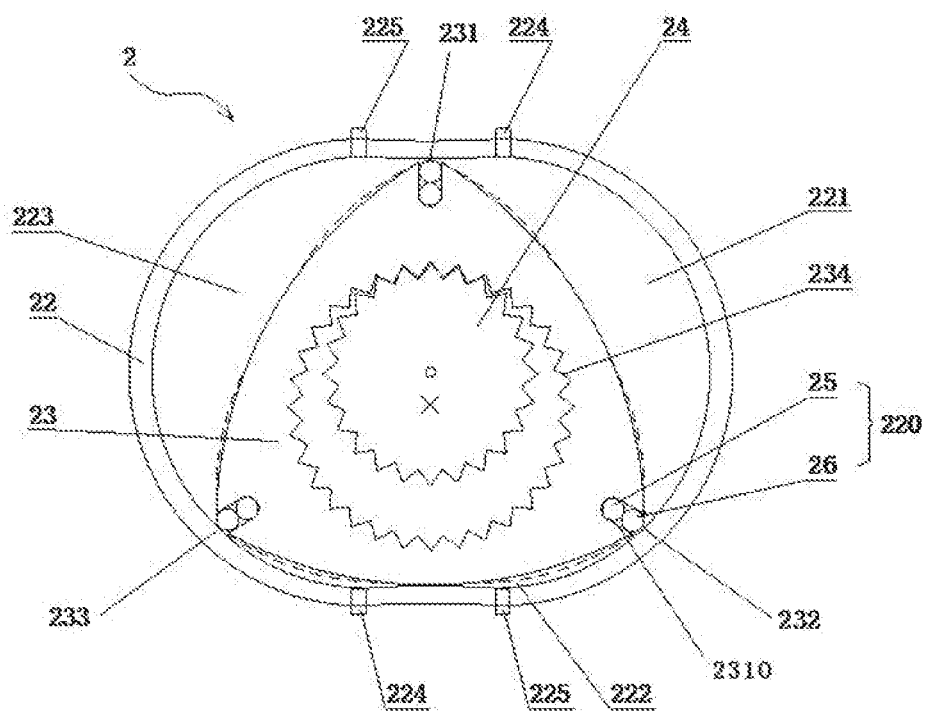
FIG. 10 is a schematic view showing the structure of another optional embodiment of the paired compress gas energy engine (i.e., a triangular rotary piston pneumatic compressor or engine) of the present invention.

Specifically, in a possible embodiment, as shown in FIG. 9, the rotary shaft 21 of the paired compress gas energy engine 2 is connected to the triangular rotary piston 23; as shown in FIG. 10, in another possible embodiment, the triangular rotary piston pneumatic compressor or engine further has a power gear shaft 24 that is provided within the triangular rotary piston 23, an inner peripheral wall of the triangular rotary piston 23 is provided with engaging convex teeth 234 that cooperate with the power gear shaft 24, the rotary shaft 21 of the paired compress gas energy engine 2 is connected to the power gear shaft 24, the axis of the triangular rotary piston 23 has a certain distance from the axis of the power gear shaft 24, and the triangular rotary piston 23 is eccentrically rotatable around the power gear shaft 24.

Further, the cross section of the cylinder body 22 substantially exhibits an elongated ellipse, the cross section of the triangular rotary piston 23 is substantially triangular, and the three side walls of the triangular rotary piston 23 are respectively designed to have a slightly outwardly curved shape. The triangular rotary piston 23 has a first end angle 231, a second end angle 232, and a third end angle 233 in rolling contact with the inner wall of the cylinder body 22, and the first end angle 231, the second end angle 232, and the third end angle 233 are sequentially provided in a clockwise direction. The cylinder body 22 is divided therein into a first inner cavity 221, a second inner cavity 222, and a third inner cavity 223 by the first end angle 231, the second end angle 232, and the third end angle 233. The inner cavity of the cylinder body 22 between the first end angle 231 and the second end angle 232 is the first inner cavity 221, the inner cavity of the cylinder body 22 between the second end angle 232 and the third end angle 233 is the second inner cavity 222, and the inner cavity of the cylinder body 22 between the third end angle 233 and the first end angle 231 is the third inner cavity 223. The gas ports for the plurality of inlets and outlets on the cylinder body 22 include two first gas ports 224 and two second gas ports 225, one first gas port 224 and one second gas port 225 are provided on each of opposite sides of the cylinder body 22, and the first gas ports 224 located on one side of the cylinder body 22 are provided opposite to the second gas ports 225 located on the other side of the cylinder body 22, that is, the two first gas ports 224 and two second gas ports 225 are alternately provided opposite to each other.

In a possible embodiment of the triangular rotary piston pneumatic compressor or engine, the first gas port 224 is connected to the high pressure air container 11, the second gas port 225 is connected to the low pressure air container 12, the paired compress gas energy engine 2 is a triangular rotary piston engine. In a state in which the first gas port 224 is in communication with the first inner cavity 221, the second inner cavity 222 or the third inner cavity 223, respectively, the triangular rotary piston 23 rotates relative to the cylinder body 22, pushed by the high pressure gas flowing into the first gas port 224; in a state in which the second gas port 225 is in communication with the first inner cavity 221, the second inner cavity 222 or the third inner cavity 223, respectively, the rotation of the triangular rotary piston 23 enables the gas within the first inner cavity 221, the gas within the second inner cavity 222 or the gas within the third inner cavity 223 to be emitted out of the second gas port 225.

Figure 11:
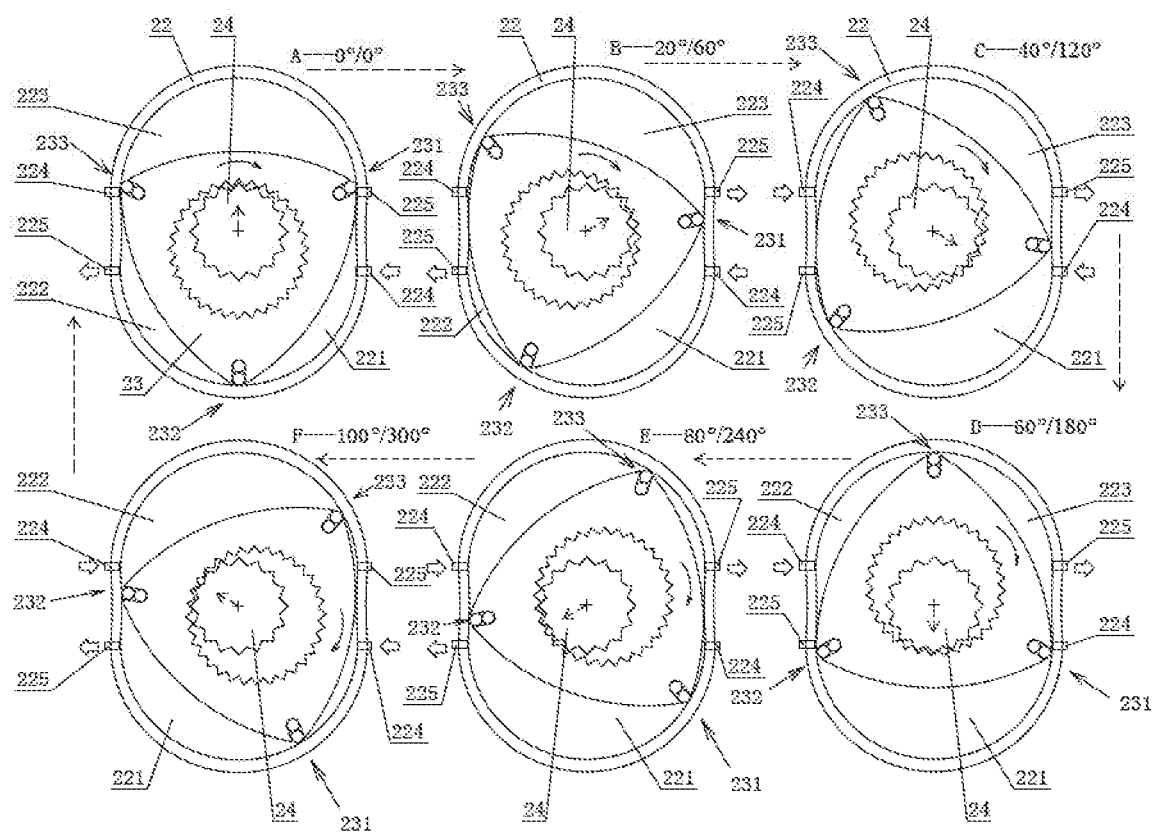
FIG. 11 are schematic structural views showing the triangular rotary piston of the triangular rotary piston gas engine of the embodiment shown in FIG. 10 at different rotational positions.

Specifically, please refer to FIGS. 1 and 11, which shows schematic views illustrating the positional state of the triangular rotary piston 23 within the cylinder body 22 in the process of the power gear shaft 24 rotating one clockwise cycle (i.e., rotating 360°) and the gas flowing into and out of the two first gas ports 224 and the two second gas ports 225. The arrows on the triangular rotary piston 23 in the figure are the rotation direction of the triangular rotary piston 23 relative to the cylinder body 22, and the hollow arrows located at the first gas port 224 and the second gas port 225 indicate intake and exhaust, respectively. FIG. 11 shows six positional states: a positional state A, in which the triangular rotary piston 23 and the power gear shaft 24 are both at the 0 coordinate position relative to the cylinder body 22; a positional state B, in which the triangular rotary piston 23 is rotated relative to the cylinder body 22 to the 20 coordinate position and the power gear shaft 24 is rotated relative to the cylinder body 22 to the 60 coordinate position; a positional state C, in which the triangular rotary piston 23 is rotated to the 40 coordinate position and the power gear shaft 24 is rotated to the 120 coordinate position; a positional state D, in which the triangular rotary piston 23 is rotated to the 60 coordinate position and the power gear shaft 24 is rotated to the 180 coordinate position; a positional state E, in which the triangular rotary piston 23 is rotated to the 80 coordinate position, and the power gear shaft 24 is rotated to the 240 coordinate position; and a positional state F, in which the triangular rotary piston 23 is rotated to the 100 coordinate position, and the power gear shaft 24 is rotated to the 300 coordinate position.

In the positional state A, as shown by the hollow arrow in the figure, the first gas port 224 on one side of the cylinder body 22 is closed, the first gas port 224 on the other side of the cylinder body 22 is in an intake state, the second gas port 225 on the other side of the cylinder body 22 is closed, and the second gas port 225 on the side of the cylinder body 22 is in a gas outlet state; at this time, as the first inner cavity 221 is in communication with the high pressure air container 11 through the first gas port 224, the first inner cavity 221 is filled with the high pressure gas, and as the second inner cavity 222 is in communication with the low pressure air container 12 through the second gas port 225, the gas within the second inner cavity 222 is emitted into the low pressure air container 12, which is due to the fact that the radial eccentric pushing force generated by the pressure difference formed in the first inner cavity 221 and the second inner cavity 222 can push the triangular rotary piston 23 to rotate clockwise, and as the pressure within the low pressure air container 12 is smaller than the pressure in the second inner cavity 222, a radial eccentric attraction is formed at the direction of the second gas port 225 to cause the triangular rotary piston 23 to rotate clockwise; at this time, no gas enters and exits the third inner cavity 223, and the eccentric force distance thereto the triangular rotary piston 23 is zero, not generating a rotational pushing force to the triangular rotary piston 23. When moving from the positional state A to the positional state B, the triangular rotary piston 23 is rotated clockwise by 20°, the power gear shaft 24 is driven to rotate clockwise by 60°, and in the positional state B different from the positional state A, the third inner cavity 223 is rotated to be in communication with the second gas port 225 located on the other side of the cylinder body 22, and at this time, the gas within the third inner cavity 223 is emitted into the low pressure air container 12, and a radial eccentric attraction is formed simultaneously to make the triangle rotary piston 23 continue to obtain a clockwise rotational force. When moving from the positional state B to the positional state C, the triangular rotary piston 23 is rotated clockwise by 40°, and the power gear shaft 24 is driven to rotate clockwise by 120°; at this time, as the first inner cavity 221 is in communication with the high pressure air container 11 still through the first gas port 224 located on the other side of the cylinder body 22, the first inner cavity 221 continues to be filled with high pressure gas, and the second gas port 225 on the side of the cylinder body 22 has been blocked by the triangular rotary piston 23, the second inner cavity 222 is rotated to communicate with the first gas port 224 on the side of the cylinder body 22, and at the time high pressure gas is emitted into the second inner cavity 222; meanwhile, the third inner cavity 223 is still in a state of being in communication with the second gas port 225 located on the other side of the cylinder body 22, the gas therein is emitted into the low pressure air container 12 through the second gas port 225. When in the positional state D, the triangular rotary piston 23 is rotated clockwise by 60°, and the power gear shaft 24 is driven to rotate clockwise by 180°; at this time, the first end angle 231 of the triangular rotary piston 23 has already been rotated past the first gas port 224 on the other side of the cylinder body 22, while the second end angle 232 of the triangular rotary piston 23 has not been rotated past the second gas port 225 on the side of the cylinder body 22, at this time, the first inner cavity 221 is in a state of no gas within and out, the second inner cavity 222 is still in a state of being in communication with the first gas port 224 located on the side of the cylinder body 22, the second inner cavity 222 continues to be filled with high pressure gas, the third inner cavity 223 is also in a state of being in communication with the second gas port 225 located the other side of the cylinder body 22, and the gas within the third inner cavity 223 continues to be emitted into the low pressure air container 12 through the second gas port 225. When passing the positional state E and the positional state F, the triangular rotary piston 23 is rotated clockwise by 80° and 100°, respectively, and the power gear shaft 24 is driven to rotate clockwise by 240° and 300°, respectively; at this time, the first inner cavity 221 is rotated to communicate with the second gas port 225 located on the side of the cylinder body 22, the gas within the first inner cavity 221 is emitted into the low pressure air container 12 through the second gas port 225, the second inner cavity 222 is still in a state of being in communication with the first gas port 224 on the side of the cylinder body 22, the second inner cavity 222 continues to be filled with high pressure gas, and the third inner cavity 223 is rotated from the state of being in communication with the second gas port 225 located on the other side of the cylinder body 22 to a state of being in communication with the first gas port 224 on the other side of the cylinder body 22. Finally, return to the positional state A again. As a result, the power gear shaft 24 totally rotates 360° clockwise, the triangular rotary piston 23 totally rotates 120°, and the first inner cavity 221, the second inner cavity 222, and the third inner cavity 223 respectively complete a complete intake stroke or exhaust stroke; after the triangular rotary piston 23 rotates 360°, the first inner cavity 221, the second inner cavity 222 and the third inner cavity 223 complete three complete intake strokes and exhaust strokes, respectively, while each stroke can work on the triangular rotary piston 23, and the power gear shaft 24 totally completes three 360° clockwise rotations.

In another possible embodiment of the triangular rotary piston pneumatic compressor or engine, the first gas port 224 is connected to the low pressure air container 12, the second gas port 225 is connected to the high pressure air container 11, and the paired compress gas energy engine 2 is a triangular rotary piston pneumatic compressor. The rotation of the triangular rotary piston 23 enables the low pressure gas within the low pressure air container 12 to flow into the first inner cavity 221, the second inner cavity 222 or the third inner cavity 223 through the first gas port 224, respectively, and during the process of an external power device drives the rotary shaft 21 to rotate and the triangular rotary piston 23 to rotate, the low pressure gas within the first inner cavity 221, the low pressure gas within the second inner cavity 222 or the low pressure gas within the third inner cavity 223 are respectively compressed into the high pressure air container 11 through the second gas port 225.

The work process of the triangular rotary piston pneumatic compressor of this embodiment is just opposite to the work process of the triangular rotary piston engine of the above embodiment, and then the specific work process thereof will not be described herein. The triangular rotary piston 23 of the triangular rotary piston pneumatic compressor of this embodiment is rotated counterclockwise relative to the cylinder body 22 under the driving of the rotary shaft 21 of the paired compress gas energy engine 2 so as to compress the low pressure gas within the low pressure air container 12 into the high pressure air container 11 such that a paired compress gas energy difference is formed between the low pressure air container 12 and the high pressure air container 11, and paired compress gas energy is formed within the paired compress gas energy storage device 1.

As shown in FIGS. 9 and 10, in the present invention, a groove 2310 is provided at each of the three contact points of the first end angle 231, the second end angle 232, and the third end angle 233 of the the triangular rotary piston 23, and two roller bars are provided within the groove 2310 to form a roller bar group 220. The roller bar group 220 includes an inner roller bar 25 and an outer roller bar 26. The cross section of the outer roller bar 26 can only be a circle while the cross section of the inner roller bar 25 can be a circle, or rectangle, or other shape. The outer roller bar 26 can be rollably provided between the inner roller bar 25 and the inner wall of the cylinder body 22.

Specifically, in the embodiment, the inner roller bar 25 may be a cylindrical rod or a spring coil; the outer roller bar 26 is a cylindrical rod to achieve rolling frictional contact between the triangular rotary piston 23 and the inner wall of the cylinder body 22.

Figure 12:
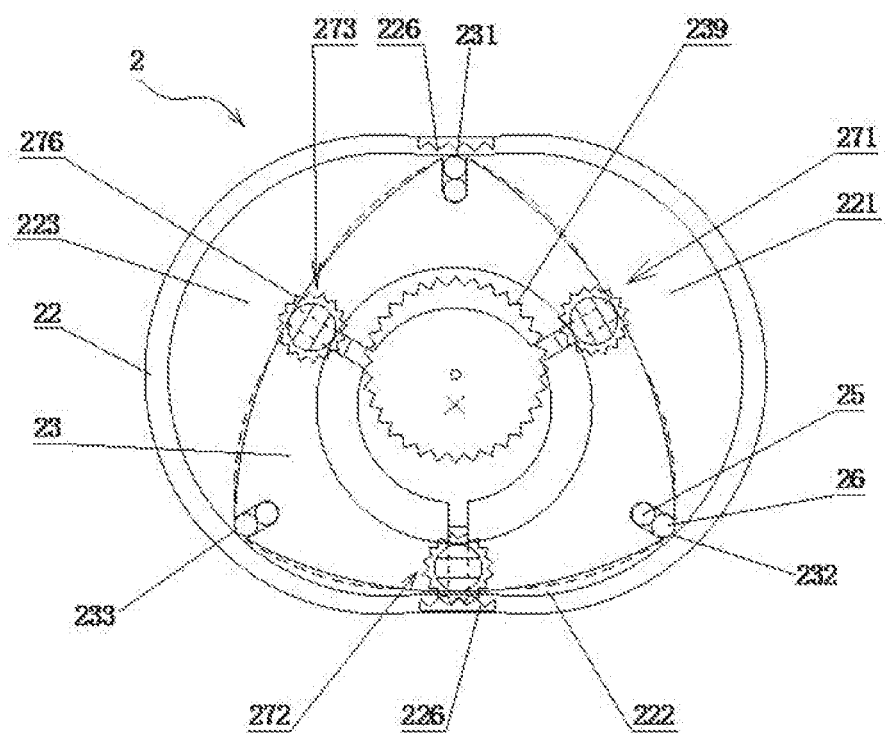
FIG. 12 is a schematic view showing the structure of a further optional embodiment of the paired compress gas energy engine (i.e., a rotary cylinder triangular piston pneumatic compressor or engine) of the present invention.
Figure 13:
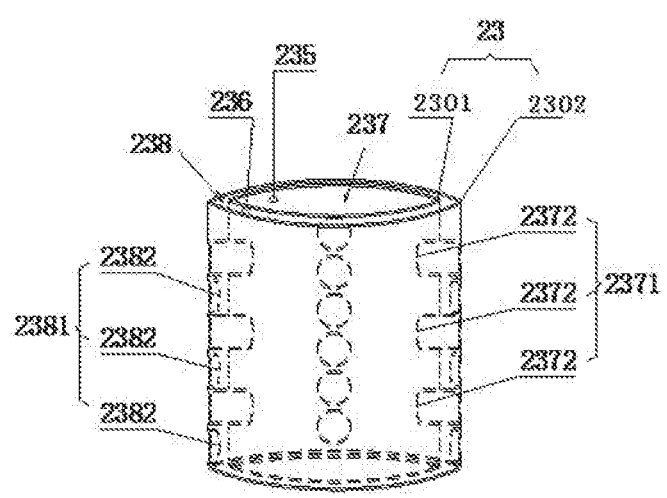
FIG. 13 is a schematic view showing the structure of the inner cavity of the triangular piston of the present invention.

In an embodiment of the present invention, as shown in FIGS. 12 and 13, the paired compress gas energy engine 2 is a paired compress gas energy rotary cylinder triangular piston pneumatic compressor or engine having a rotatable cylinder body 22 and an inner non-rotating triangular piston 23 provided within the cylinder body 22. The triangular piston 23 has a triangular cross section, the triangular piston 23 is provided with a third gas port 235 and a fourth gas port 236 connected to the paired compress gas energy storage device 1, and the inner cavity of the triangular piston 23 can communicate with the inner cavity of the cylinder body 22.

Specifically, the cross section of the cylinder body 22 exhibits a substantially elongated elliptical shape, the cross section of the triangular piston 23 is substantially triangular, and the three side walls of the triangular piston 23 are respectively designed to have a slightly outwardly curved shape. The triangular piston 23 has a first end angle 231, a second end angle 232, and a third end angle 233 in rolling contact with the inner wall of the cylinder body 22, the first end angle 231, the second end angle 232, and the third end angle 233 are provided in turn in a clockwise direction, and the cylinder body 22 is divided into a first inner cavity 221, a second inner cavity 222, and a third inner cavity 223 by means of the first end angle 231, the second end angle 232, and the third end angle 233. The inner cavity of the cylinder body 22 between the first end angle 231 and the second end angle 232 is the first inner cavity 221, the inner cavity of the cylinder body 22 between the second end angle 232 and the third end angle 233 is the second inner cavity 222, and the inner cavity of the cylinder body 22 between the third end angle 233 and the first end angle 231 is the third inner cavity 223.

Further, in this embodiment, the rotary shaft of the paired compress gas energy engine is connected to the cylinder body. As shown in FIG. 13, the inner cavity of the triangular piston 23 includes a first piston inner cavity 237 and a second piston inner cavity 238, the first piston inner cavity 237 is in communication with the third gas port 235, and the second piston inner cavity 238 is in communication with the fourth gas port 236. The triangular piston 23 is provided with a first gas delivery piston 271, a second gas delivery piston 272 and a third gas delivery piston 273. The first gas delivery piston 271, the second gas delivery piston 272 and the third gas delivery piston 273 are provided in turn in a clockwise direction. The first gas delivery piston 271 is provided opposite to the first inner cavity 221, the second gas delivery piston 272 is provided opposite to the second inner cavity 222, and the third gas delivery piston 273 is provided opposite to the third inner cavity 223.

Figure 14:
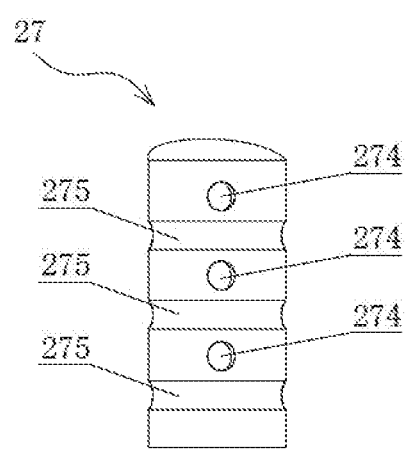
FIG. 14 is a schematic view showing the structure of the piston rod (i.e., the first gas delivery piston, the second gas delivery piston or the third gas delivery piston) of the present invention.

As shown in FIG. 14, the first gas delivery piston 271, the second gas delivery piston 272, and the third gas delivery piston 273 each may be a piston rod 27 axially rotatably provided on the triangular pistons. The piston rod 27 is provided, along its axial direction, with a plurality of radial first passages 274 that are spaced in parallel with each other, and a second passage 275 is provided between two adjacent first passages 274. The second passage 275 has an angle with the first passage 274. In a possible embodiment, the first passage 274 and the second passage 275 are perpendicular to each other, that is, the radial plane angle between the second passage 275 and the first passage 274 is 90°.

Referring to FIG. 13, the triangular piston 23 is composed of an inner cylinder 2301 and an outer cylinder 2302 sleeved outside the inner cylinder 2301. The inner cavity of the inner cylinder 2301 is the first piston inner cavity 237. The annular space formed between the outer cylinder 2302 and the inner cylinder 2301 is the second piston inner cavity 238. The first piston inner cavity 237 can communicate with the first inner cavity 221, the second inner cavity 222, or the third inner cavity 223, respectively through the plurality of first passages 274. The second inner cavity 222 can communicate with the first inner cavity 221, the second inner cavity 222, or the third inner cavity 223, respectively through the plurality of second passages 275. In the present invention, the side wall of the inner cylinder 2301 is provided with three columns of first side cavity passages 2371 in the circumferential direction, each column of first side cavity passages 2371 includes a plurality of first side cavity ports 2372 which are axially spaced apart, and the position of the first side cavity port 2372 is provided to be i relative communication with the first passage 274; the side wall of the outer cylinder 2302 is provided with three columns of second side cavity passages 2381 in the circumferential direction, each column of second side cavity passages 2381 includes a plurality of second side cavity ports 2382 which are axially spaced apart, and the position of the second side cavity port 2382 is provided to be i relative communication with the second passage 275.

Referring to FIG. 12, a gear shaft 239 is provided at the axial center of the cylinder body 22. The opposite sides of the inner wall of the cylinder body 22 are respectively provided with inner convex teeth 226. Each of the piston rods 27 is provided with transmission teeth 276. The transmission teeth 276 can cooperate with the gear shaft 239 and the inner convex teeth 226 such that the transmission teeth 276 is driven by the gear shaft 239 and the inner convex teeth 226 to rotate and drive the piston rod 27 to rotate, so that the gas can pass through the piston rod 27 in two directions through the first passage 274 or the second passage 275.

Figure 15:
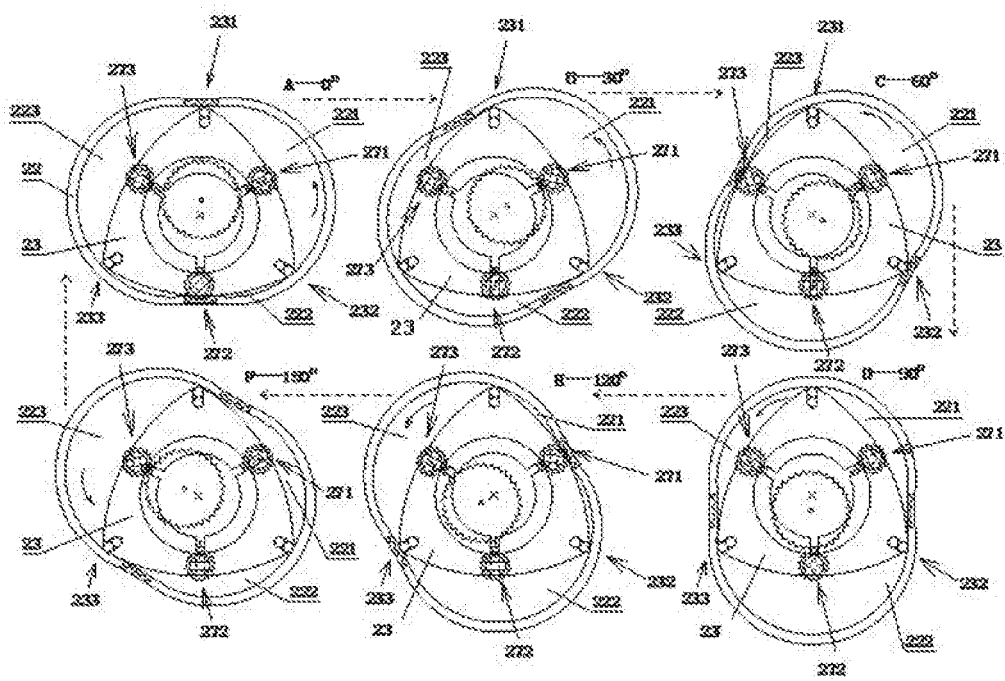
FIG. 15 shows schematic structural views of the triangular piston of the rotary cylinder triangular piston engine of the embodiment shown in FIG. 12 at different rotational positions.

As shown in FIG. 15, in a possible embodiment of the paired compress gas energy engine 2, the third gas port 235 is connected to the high pressure air container 11, the fourth gas port 236 is connected to the low pressure air container 12, and the paired compress gas energy engine 2 is a rotary cylinder triangular piston engine. In a state in which the third gas port 235 is in communication with the first inner cavity 221, the second inner cavity 222 or the third inner cavity 223, the high pressure gas that is introduced from the third gas port 235 can flow into the first inner cavity 221, the second inner cavity 222 or the third inner cavity 223, respectively, and the cylinder body 22 is rotated relative to the triangular piston 23, pushed by the high pressure gas; in a state in which the fourth gas port 236 is in communication with the first inner cavity 221, the second inner cavity 222 or the third inner cavity 223 respectively, the rotation of the cylinder body 22 enables the gas within the first inner cavity 221, the gas within the second inner cavity 222, or the gas within the third inner cavity 223 to be emitted out of the fourth gas port 236, respectively.

Specifically, please refer to FIGS. 1 and 15, which shows the state of the gas intake and exhaust of the first gas delivery piston 271, the second gas delivery piston 272 and the third gas delivery piston 273 on the triangular piston 23 in the process of the cylinder body 22 rotating by 180. The arcuate arrow within the cylinder body 22 in the figure indicates the direction in which the cylinder body 22 rotates. FIG. 15 shows six positional states: a positional state A, in which the cylinder body 22 is at the 0 coordinate position; a positional state B, in which the cylinder body 22 is rotated relative to the triangular piston 23 to the 30 coordinate position; a positional state C, in which the cylinder body 22 is rotated relative to the triangular piston 23 to the 60 coordinate position; a positional state D, in which the cylinder body 22 is rotated relative to the triangular piston 23 to the 90 coordinate position; a positional state E, in which the cylinder body 22 is rotated relative to the triangular piston 23 the 120 coordinate position; and a positional state F, in which the cylinder body 22 is rotated relative to the triangular piston 23 to the 150 coordinate position.

In the positional state A, the cylinder body 22 is at the 0 position relative to the triangular piston 23; the second gas delivery piston 272 is in a closed state, that is, it is not in communication with the inner cavity of the triangular piston 23 and the second inner cavity 222; at the time, the second passage 275 of the third gas delivery piston 273 is in communication with the second piston inner cavity 238, the second piston inner cavity 238 is in communication with the fourth gas port 236 connected to the low pressure air container 12, and the gas within the third inner cavity 223 can be emitted out of the fourth gas port 236; at the same time, the first passage 274 of the first gas delivery piston 271 is in communication with the first piston inner cavity 237, the first piston inner cavity 237 is in communication with the third gas port 235 connected to the high pressure air container 11, the first inner cavity 221 is filled with high pressure gas, and at this time, the radial eccentric pushing force generated by the gas energy pressure difference between the cylinder body 22 and the triangular piston 23 can push the cylinder body 22 to rotate counterclockwise. When the cylinder body 22 is moved to the positional state B, the cylinder body 22 has been rotated relative to the triangular piston 23 by 30; the second gas delivery piston 272 is rotated by the convex teeth 226 within the cylinder body 22, the first passage 274 thereof is rotated to be in communication with the first piston inner cavity 237, and the second inner cavity 222 is filled with high pressure gas; at this time, the second passage 275 of the third gas delivery piston 273 is still in communication with the second piston inner cavity 238, and the gas within the third inner cavity 223 is continuously emitted out of the fourth gas port 236; and the first gas transfer piston 271 is rotated under the driving of the gear shaft 239 to a closed state. When the cylinder body 22 is moved to the positional state C, the cylinder body 22 has been rotated relative to the triangular piston 23 by 600; at this time, the first gas delivery piston 271 is rotated by the gear shaft 239 to a state of being in communication with the first piston inner cavity 237, the gas within the first inner cavity 221 is emitted out of the fourth gas port 236; the first passage 274 of the second gas delivery piston 272 is still in communication with the first piston inner cavity 237, and the second inner cavity 222 is continuously filled with high pressure gas; at this time, the third gas delivery piston 273 is rotated to a closed state under the driving of the inner convex teeth 226 of the cylinder body 22. When the cylinder body 22 is moved to the positional state D, the cylinder body 22 has been rotated relative to the triangular piston 23 by 90°; the second gas delivery piston 272 is rotated under the driving of the gear shaft 239 to a closed state, and the gas in the second inner cavity 222 does not work on the rotation of the cylinder body 22; the third gas delivery piston 273 is rotated under the driving of the convex teeth 226 within the cylinder body 22 until the first passage 274 thereof is in communication with the first piston inner cavity 237, and the third inner cavity 223 is filled with high pressure gas; at this time, the second passage 275 of the first gas delivery piston 271 is still in communication with the second piston inner cavity 238, and the gas within the first inner cavity 221 is emitted out of the fourth gas port 236. When the cylinder body 22 is moved to the positional state E, the cylinder body 22 has been rotated relative to the triangular piston 23 by 120°; the first gas delivery piston 271 is rotated under the driving of the convex teeth 226 within the cylinder body 22 to the closed state; the first passage 274 of the third gas delivery piston 273 is still in communication with the first piston inner cavity 237, and the third inner cavity 223 continues to be filled with high pressure gas; at this time, the second gas delivery piston 272 is rotated under the driving of the gear shaft 239 until the second passage 275 thereof is in communication with the second piston inner cavity 238, and the gas within the second inner cavity 222 is emitted out of the fourth gas port 236. When the cylinder body 22 is moved to the positional state F, the cylinder body 22 has been rotated relative to the triangular piston 23 by 150°; the third gas delivery piston 273 is rotated to the closed state under the driving of the gear shaft 239; the first gas delivery piston 271 is rotated under the driving of the inner protruding tooth 226 in the cylinder body 22 downward until the first passage 274 thereof is in communication with the first piston inner cavity 237, and the first inner cavity 221 is filled with high pressure gas; at this time, the second passage 275 of the second gas delivery piston 272 is still in communication with the second piston inner cavity 238, the gas within the second inner cavity 222 is emitted out of the fourth gas port 236, and at this time, under the action of the gas energy pressure difference between the second inner cavity 222 and the first inner cavity 221, the cylinder body 22 continues to rotate counterclockwise to the position state A. As a result, the cylinder body has been rotated counterclockwise by 180°, the first inner cavity 221, the second inner cavity 222, and the third inner cavity 223 each complete a complete intake stroke and an exhaust stroke, that is, each of the three cylinders completes a complete intake stroke and exhaust stroke, and each stroke can work on the rotation of the cylinder.

In a possible embodiment of the paired compress gas energy engine 2, the third gas port 235 is connected to the low pressure air container 12, the fourth gas port 236 is connected to the high pressure air container 11, and the paired compress gas energy engine 2 is a rotary cylinder triangular piston pneumatic compressor. The low pressure gas within the low pressure air container 12 can flow into the first inner cavity 221, the second inner cavity 222 or the third inner cavity 223 through the third gas port 235, respectively. In a state in which the first inner cavity 221, the second inner cavity 222 or the third inner cavity 223 is respectively in communication with the fourth gas port 236, the gas within the first inner cavity 221, the gas within the second inner cavity 222, or the gas within the third inner cavity 223 can be respectively compressed into the high pressure air container 11 through the fourth gas port 236.

The work process of the rotary cylinder triangular piston pneumatic compressor of this embodiment is just opposite to the work process of the rotary cylinder triangular piston engine (the embodiment shown in FIG. 12) of the above embodiment, and the specific work process thereof will not be described herein. The cylinder body 22 of the rotary cylinder triangular piston pneumatic compressor of this embodiment is rotated clockwise relative to the triangular piston 23 under the driving of the rotary shaft 21 of the paired compress gas energy engine 2 so as to compress the low pressure gas within the low pressure air container 12 into the high pressure air container 11 such that a gas pressure difference is formed between the low pressure air container 12 and the high pressure air container 11, and paired compress gas energy is formed within the paired compress gas energy storage device 1.

According to an embodiment of the present invention, the paired compress gas energy engine 2 is a paired compress gas energy multi-arc rotary piston pneumatic compressor or engine having a cylinder body 22 and a multi-arc rotor 28 rotatably provided within the cylinder body 22. The multi-arc rotor 28 has a plurality of curved outer walls 281 provided in the circumferential direction. The cylinder body 22 has a plurality of curved inner walls 227 provided in the circumferential direction. The curved outer walls 281 and the curved inner walls 227 are in contact with each other and fitted to each other. The cylinder body 22 is provided with gas ports for a plurality of inlets and outlets connected to the paired compress gas energy storage device 1. There is n curved outer walls 281, there are n+1 curved inner walls 227, and there are n+1 gas inlet and outlet ports, where n is a natural number.

Figure 16:
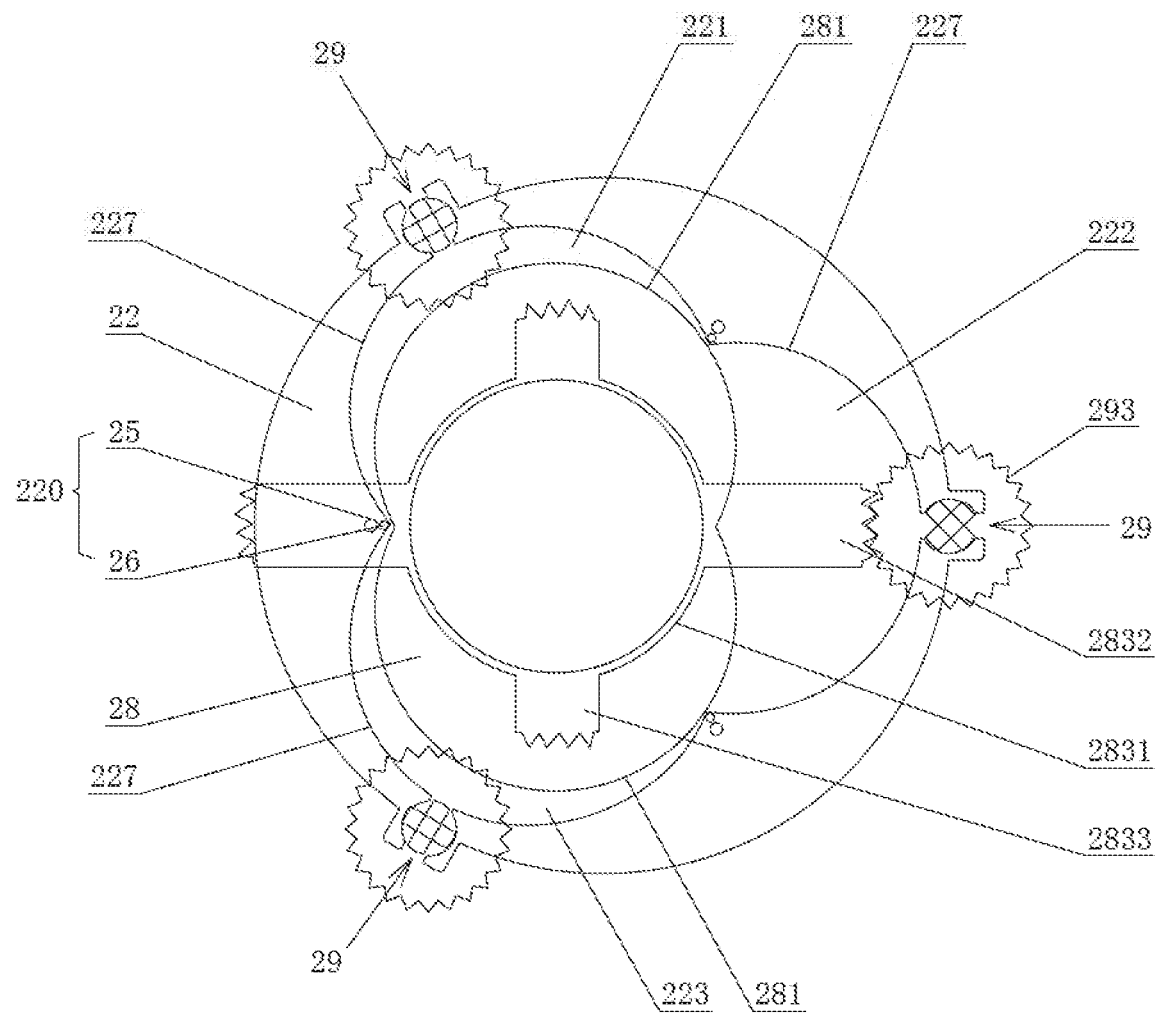
FIG. 16 is a schematic view showing the structure of an optional embodiment of the paired compress gas energy engine (i.e., a two-arc rotary piston pneumatic compressor or engine) of the present invention.
Figure 17:
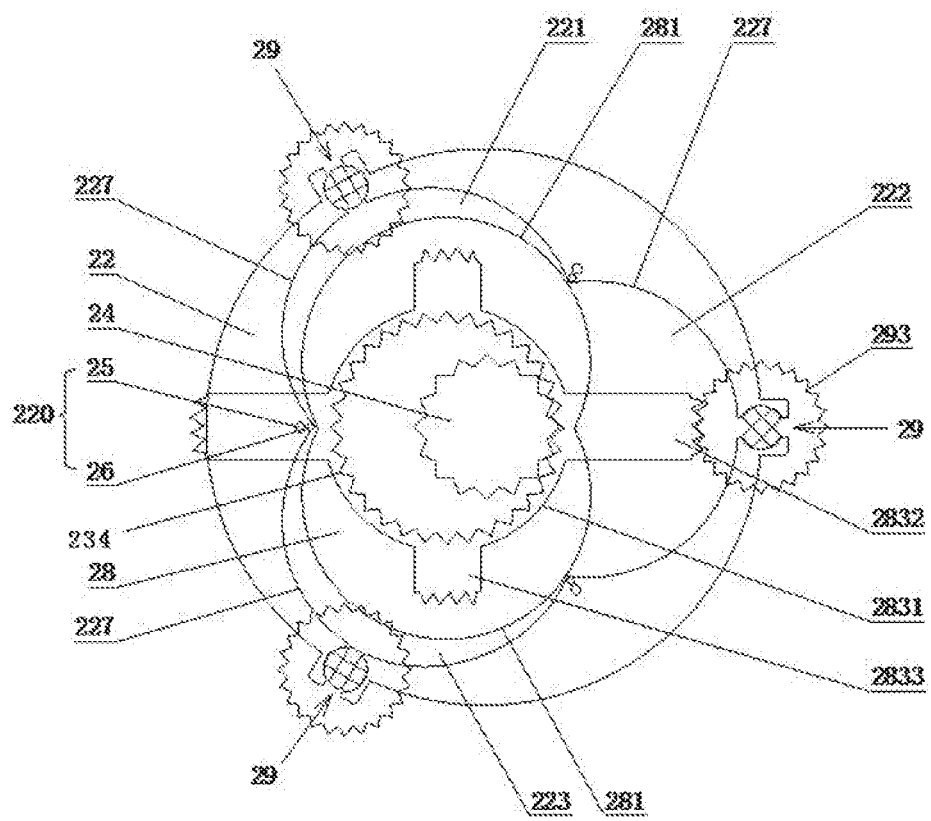
FIG. 17 is a schematic view showing the structure of another optional embodiment of the paired compress gas energy engine (i.e., a two-arc rotary piston pneumatic compressor or engine) of the present invention.
Figure 18:
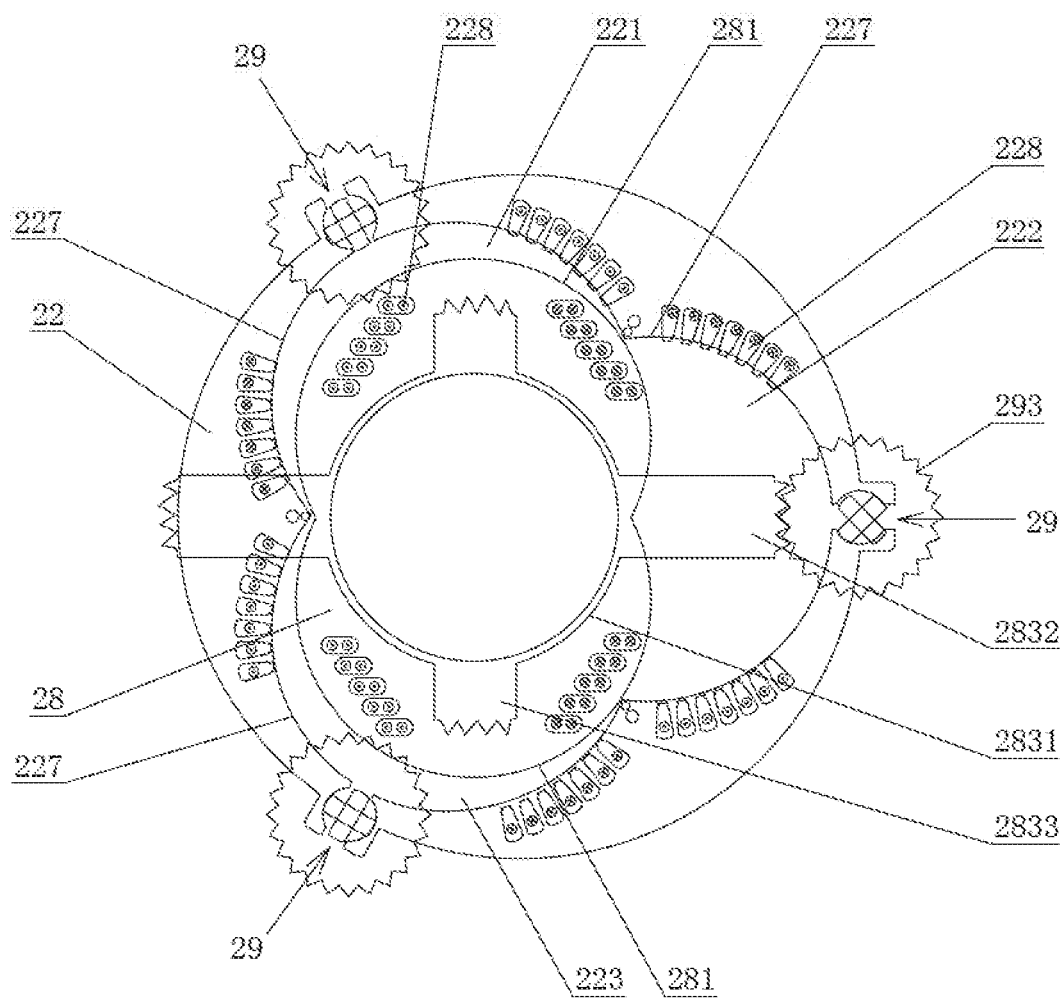
FIGS. 18 and 19 are schematic structural views of optional embodiments of the two-arc rotary piston pneumatic compressor or engine provided with electromagnets or permanent magnets in FIGS. 16 and 17, respectively.
Figure 19:
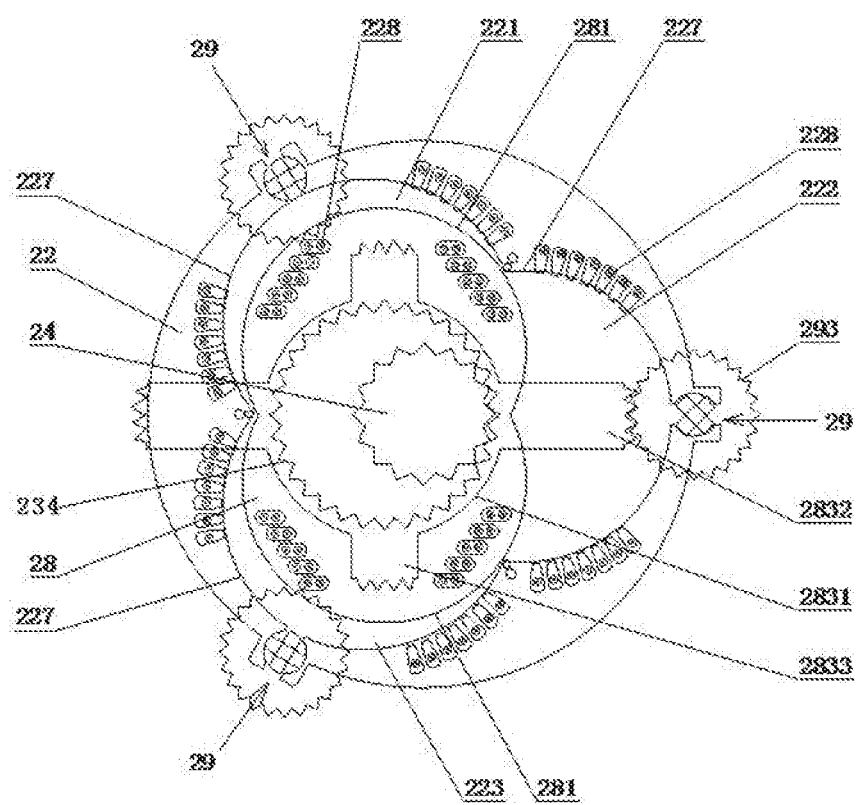

Specifically, in a possible embodiment, as shown in FIGS. 16 to 22, the rotary shaft 21 of the paired compress gas energy engine 2 is connected to the multi-arc rotor 28. In another possible embodiment, as shown in FIG. 17 and FIG. 19, the paired compress gas energy multi-arc rotary piston pneumatic compressor or engine further has a power gear shaft 24. The power gear shaft 24 is provided within the multi-arc rotor 28. The inner peripheral wall of the multi-arc rotor 28 is provided with engaging convex teeth 234 that cooperate with the power gear shaft 24, and the rotary shaft 21 of the paired compress gas energy engine 2 is connected to the power gear shaft 24.

Further, the cylinder body 22 is split into the first inner cavity 221, the second inner cavity 222 and the third inner cavity 223 by the multi-arc rotor 28; gas ports for a plurality of inlets and outlets on the cylinder body 22 can respectively be in communication with the first inner cavity 221, the second inner cavity 222 or the third inner cavity 223.

In an embodiment of the invention, each of the gas inlet and outlet ports includes a plurality of third passages 291 and a plurality of fourth passages 292.

In a possible embodiment, as shown in FIGS. 1 and 16 to 22, the third passage 291 is connected to the high pressure air container 11, the fourth passage 292 is connected to the low pressure air container 12, and the paired compress gas energy engine 2 is a paired compress gas energy multi-arc rotary piston engine.

Figure 20:
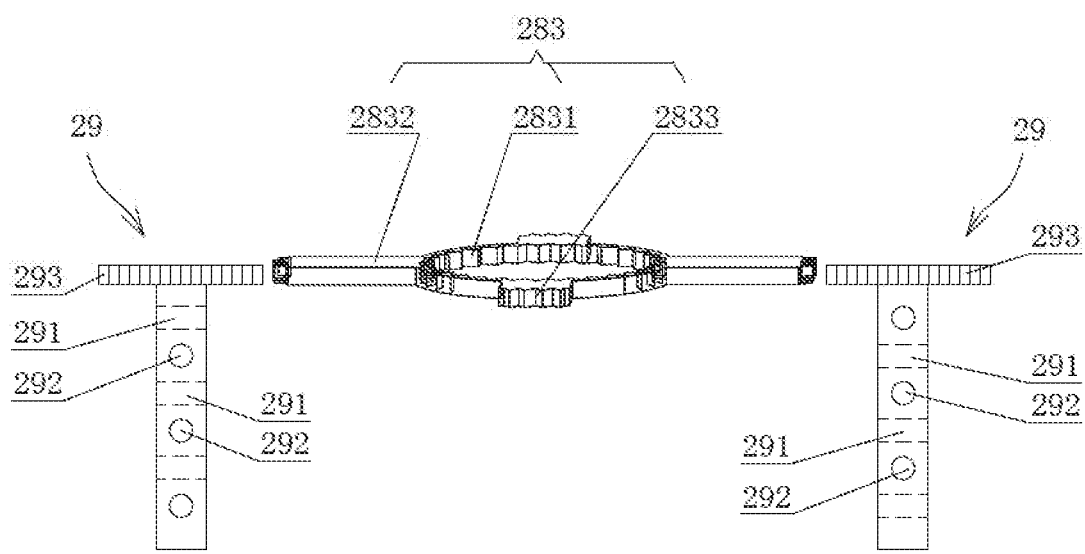
FIG. 20 is a schematic view showing the structure of the rotor gas valve mechanism and a gas valve rod of the present invention.

Specifically, as shown in FIG. 20, a valve rod 29 is rotatably provided within each of the gas inlet and outlet ports, and the gas valve rod 29 has, in the axial direction thereof, a plurality of third passages 291 which are spaced apart in parallel to each other, a fourth passage 292 is provided between two adjacent third passages 291, and the third passage 291 and the fourth passage 292 have an angle therebetween; in the embodiment, the third passage 291 and the fourth passage 292 are perpendicular to each other, that is, the radial plane angle between the third passage 291 and the fourth passage 292 is 90°.

Further, a rotor gas valve mechanism 283 is connected to the multi-arc rotor 28, and the rotor gas valve mechanism 283 is used for opening or closing the plurality of third passages 291 and the plurality of fourth passages 292 of each of the gas inlet and outlet ports. The rotor gas valve mechanism 283 includes a valve swivel 2831. The valve swivel 2831 is provided with a plurality of first convex teeth 2832 and a plurality of second convex teeth 2833 along the circumferential direction thereof, the first convex teeth 2832 being longer than the second convex teeth 2833 in terms of tooth length, and a first protruding tooth 2832 is provided between two adjacent second convex teeth 2833; a gas valve rod 29 is connected to a rod gear 293, the second convex teeth 2833 and the first convex teeth 2832 can be respectively driven and connected to the rod gear 293, and the number of the first convex teeth 2832 and the number of the second convex teeth 2833 are respectively n+1.

Figure 24:
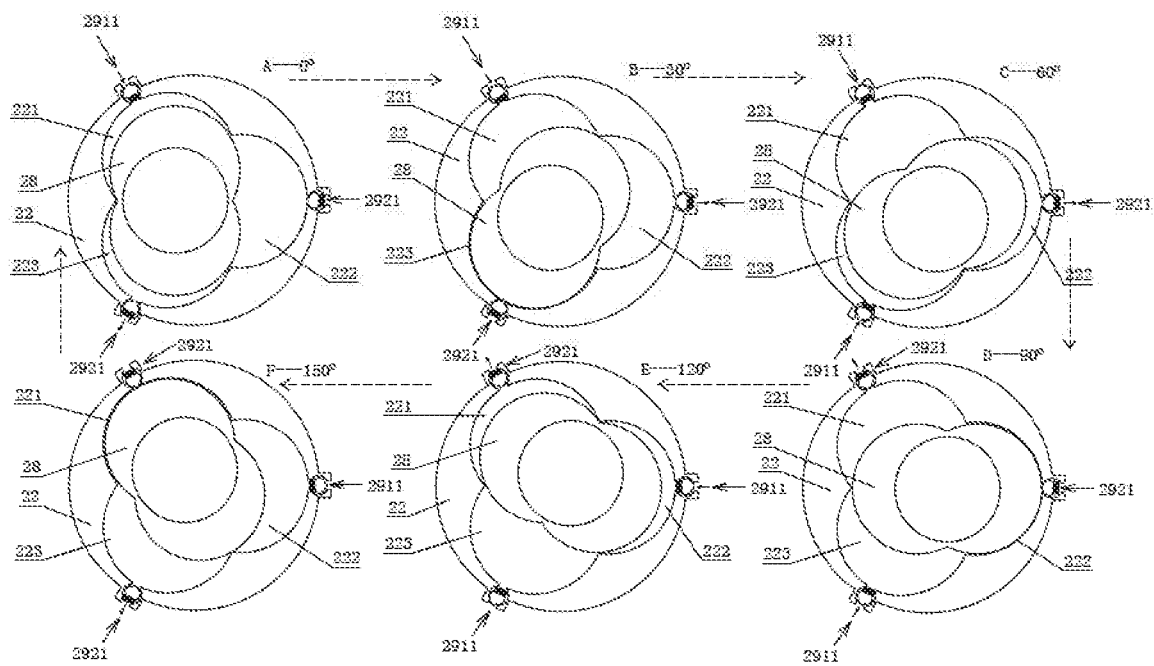
FIG. 24 shows schematic structural views of the two-arc rotor of the two-arc rotary piston compressor of the embodiment shown in FIG. 16 at different rotational positions.

In another possible embodiment, as shown in FIGS. 1, 20 and 24, the third passage 291 is connected to the low pressure air container 12, the fourth passage 292 is connected to the high pressure air container 12, and the paired compress gas energy engine 2 is a paired compress gas energy multi-arc rotary piston pneumatic compressor.

Specifically, a fourth passage 292 is provided between two adjacent third passages 291, the plurality of third passages 291 and the plurality of fourth passages 292 are provided in parallel with each other, a first one-way valve 2911 is provided within the third passage 291, and a second one-way valve 2921 is provided within the fourth passage 292. When the gas within the low pressure air container 12 is injected into the inner cavity of the cylinder body 22 through the third passage 291, the first one-way valve 2911 can open the third passage 291 without causing the gas within the inner cavity of the cylinder body 22 to flow back into the low pressure air container 12; when the gas within the inner cavity of the cylinder body 22 is compressed into the high pressure air container 11 through the fourth passage 292, the second one-way valve 2922 can open the fourth passage 292, and the gas within the high pressure air container 11 will not flow back into the inner cavity of the cylinder body 22.

FIGS. 16 to 19 show a possible embodiment of the multi-arc rotary piston pneumatic compressor or engine of the present invention, wherein the multi-arc rotor 28 is a two-arc rotor having two curved outer walls 281 provided opposite to each other, that is, n=2; the cylinder body 22 has three curved inner walls 227 connected in series, the curved outer walls 281 cooperate with the curved inner walls 227, and the cylinder body 22 has three gas ports. In the present embodiment, as shown in FIGS. 16 and 17, two roller bars are provided at each of the three contact points of the cylinder body 22 and the multi-arc rotor 28 to form a roller bar group 220. The roller bar group 220 includes an inner roller bar 25 and an outer roller bar 26. The cross section of the outer roller bar 26 can only be a circle, and the cross section of the inner roller bar 25 can be a circle, or rectangle, or other shape.

Figure 21:
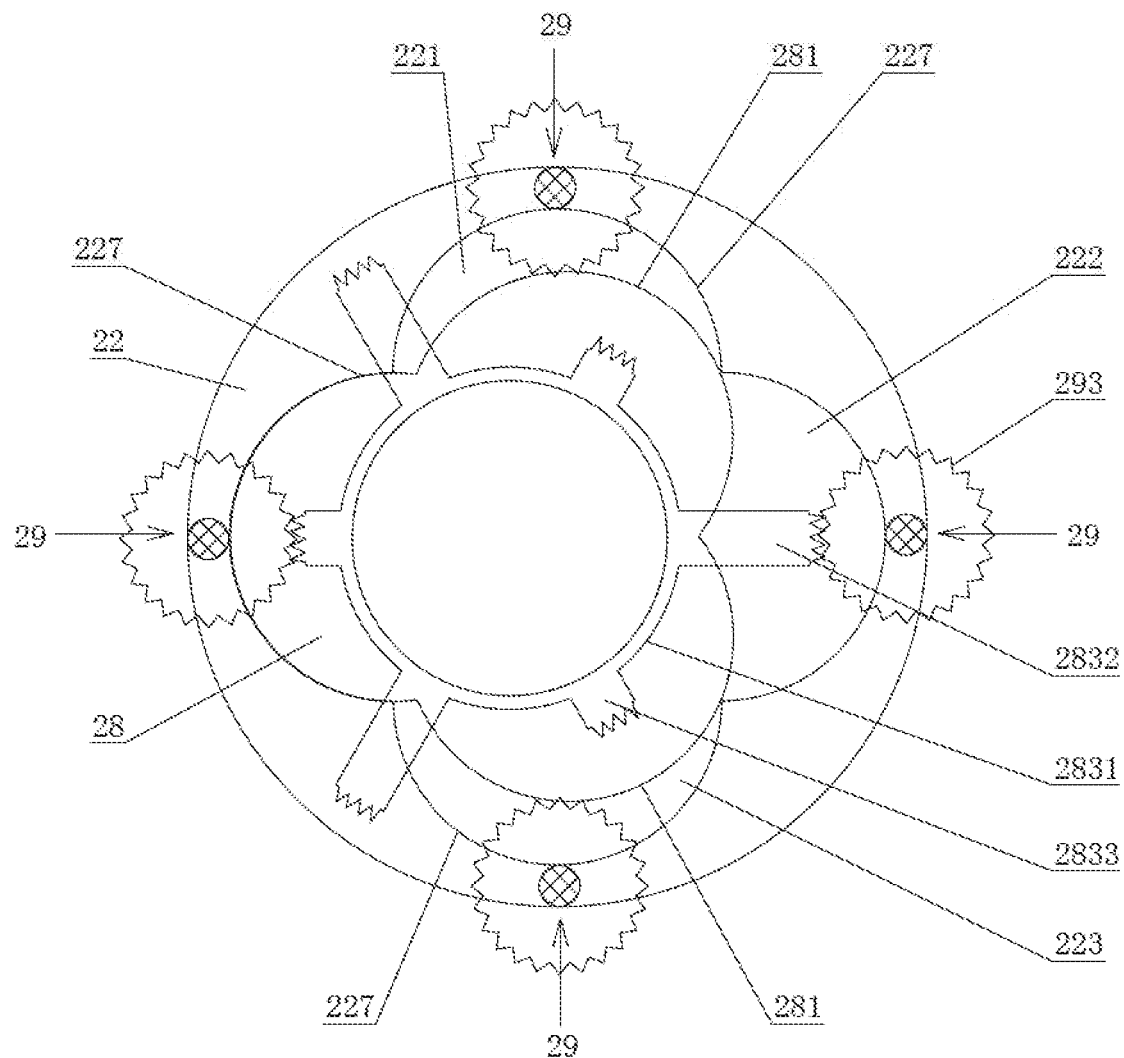
FIG. 21 is a schematic view showing the structure of an optional embodiment of the paired compress gas energy engine (i.e., a three-arc rotary piston pneumatic compressor or engine) of the present invention.

FIG. 21 is a possible embodiment of the multi-arc rotary piston engine of the present invention, wherein the multi-arc rotor 28 is a three-arc rotor having three curved outer walls 281 provided in the circumferential direction, i.e., n=3; the cylinder body 22 has four arcuate inner walls 227 connected in series, the curved outer walls 281 cooperate with the arcuate inner walls 227, and the cylinder body 22 has four gas ports.

Figure 22:
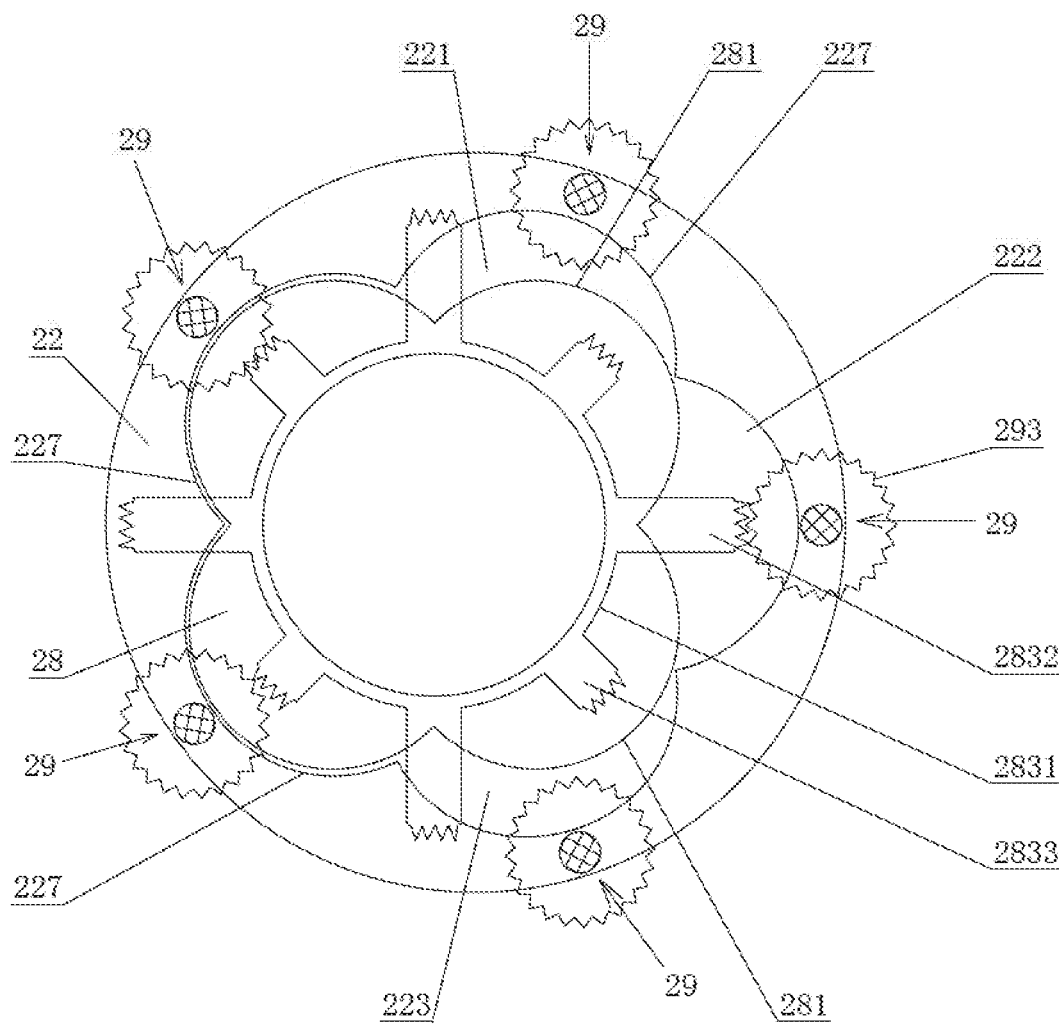
FIG. 22 is a schematic view showing the structure of an optional embodiment of the paired compress gas energy engine (i.e., a four-arc rotary piston pneumatic compressor or engine) of the present invention.

FIG. 22 is a possible embodiment of the multi-arc rotary piston engine of the present invention, wherein the multi-arc rotor 28 is a four-arc rotor having four arcuate outer walls 281 provided in the circumferential direction, i.e., n=4; the cylinder body 22 has five arcuate inner walls 227 connected in series, the curved outer walls 281 cooperate with the arcuate inner walls 227, and the cylinder body 22 has five gas ports.

Of course, in other embodiments, the multi-arc rotary piston pneumatic compressor or engine may also be a paired compress gas energy engine having a five-arc rotor, a six-arc rotor, or the like, which is not limited herein.

In an embodiment of the present invention, as shown in FIG. 18 and FIG. 19, an electromagnet or a permanent magnet 228 may be respectively provided on the cylinder body 22 and the multi-arc rotor 28. The purpose of driving the multi-arc rotor 28 to rotate within the cylinder body 22 is achieved by the electromagnet or permanent magnet 228.

The specific work process thereof is illustrated below by taking the two-arc rotary piston pneumatic compressor or engine as an example.

Figure 23:
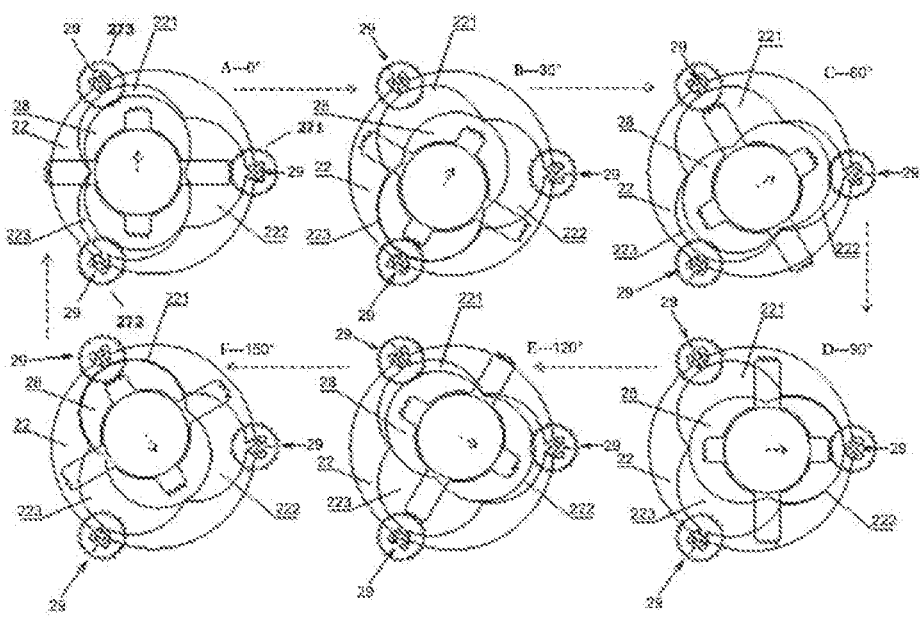
FIG. 23 shows schematic structural views of the two-arc rotor of the two-arc rotary piston engine of the embodiment shown in FIG. 16 at different rotational positions.

In a possible embodiment, please refer to FIGS. 1 and 16 to 23, which is a working flow chart of a two-arc rotary piston engine, and shows the state of the intake and exhaust of the first gas delivery piston 271, the second gas delivery piston 272, and the third gas delivery piston 273 on the triangular rotary piston 23 during the process of the two-arc rotor being rotated relative to the cylinder body from 0° to 180°. FIG. 23 shows six positional states: a positional state A, in which the two-arc rotor is at the 0° coordinate position relative to the cylinder body 22; a positional state B, in which the two-arc rotor is rotated relative to the cylinder body 22 to a coordinate position after 30°; a positional state C, in which the two-arc rotor is rotated relative to the cylinder body 22 to a coordinate position after 60°; a positional state D, in which the two-arc rotor is rotated relative to the cylinder body 22 to a coordinate position after 90°; a positional state E, in which the two-arc rotor is rotated relative to the cylinder body 22 to a coordinate position after 120°; a positional state F, in which the two-arc rotor is rotated relative to the cylinder body 22 to a coordinate position after 150°.

In the positional state A, the two-arc rotor is located at 0° relative to the cylinder body 22; the gas passages of the gas valve rod 29 opposite to the second inner cavity 222 are in a closed state, and the gas within the second inner cavity 222 does not work on the rotation of the two-arc rotor; the plurality of third passages 291 of the gas valve rod 29 opposite to the first inner cavity 221 are in communication with the high pressure air container 11, and the first inner cavity 221 is filled with high pressure gas; at the time, the fourth passage 292 of the gas valve rod 29 opposite to the three inner cavities 223 is in communication with the low pressure air container 12, the gas within the third inner cavity 223 can be emitted into the low pressure air container 12, and the two-arc rotor is rotated clockwise relative to the cylinder body 22 under the action of the gas pressure difference in the first inner cavity 221 and the third inner cavity 223. In the positional state B, the two-arc rotor is rotated relative to the cylinder body 22 to the 30° position; under the action of the first convex teeth 2832 of the rotor gas valve mechanism 283, the rod gear 293 on the gas valve rod 29 opposite to the second inner cavity 222 is rotated, the fourth passage 292 on the gas valve rod 29 is in communication with the second inner cavity 222, and the gas within the second inner cavity 222 is emitted into the low pressure air container 12; at the time, the plurality of third passages 291 of the gas valve rod 29 opposite to the first inner cavity 221 are still in a state of being in communication with the high pressure air container 11, the first inner cavity 221 is continuously filled with high pressure gas; and the third inner cavity 223 is filled by tone of the curved outer walls 281 of the two-arc rotor, the rod gear 293 of the gas valve rod 29 opposite to the third inner cavity 223 is rotated under the driving of the second convex teeth 2833 of the rotor gas valve mechanism 283 to a closed state, and the two-arc rotor continues to rotate clockwise relative to the cylinder body 22 under the action of the gas pressure difference between the first inner cavity 221 and the second inner cavity 222. In the positional state C, the two-arc rotor is rotated relative to the cylinder body 22 to the 60° position; under the action of the second convex teeth 2833 of the rotor gas valve mechanism 283, the rod gear 293 on the gas valve rod 29 opposite to the third inner cavity 223 is rotated, the third passage 291 on the gas valve rod 29 is in communication with the third inner cavity 223, and the third inner cavity 223 is filled with high pressure gas; at this time, the rod gear 293 on the gas valve rod 29 opposite to the first inner cavity 221 is rotated by the first convex teeth 2832, the gas valve rod 29 is in a closed state, and the first inner cavity 221 has no gas within and out; at this time, the plurality of fourth passages 292 of the gas valve rod 29 opposite to the second inner cavity 222 are still in communication with the low pressure air container 12, the gas within the second inner cavity 222 can be emitted into the low pressure air container 12, and under the action of the gas pressure difference between the third inner cavity 223 and the second inner cavity 222, the two-arc rotor continues to rotate clockwise relative to the cylinder body 22. In the positional state D, the two-arc rotor is rotated relative to the cylinder body 22 to the 90° position; under the action of the second convex teeth 2833 of the rotor gas valve mechanism 283, the rod gear 293 on the gas valve rod 29 opposite to the second inner cavity 222 is rotated, and the gas valve rod 29 is in a closed state; at this time, after the rod gear 293 on the gas valve rod 29 opposite to the first inner cavity 221 is rotated by the first convex teeth 2832, the fourth passage 292 of the gas valve rod 29 is in communication with the first inner cavity 221, and the gas within the first inner cavity 221 is emitted into the low pressure air container 12; meanwhile, the plurality of fourth passages 292 of the gas valve rod 29 opposite to the third inner cavity 223 are still in a state of being in communication with the high pressure air container 11, the third inner cavity 223 continues to be filled with high pressure gas, and the two-arc rotor continues to rotate clockwise relative to the cylinder body 22 under the action of the gas pressure difference between the third inner cavity 223 and the first inner cavity 221. In the positional state E, the two-arc rotor is rotated relative to the cylinder body 22 to the 120° position; under the action of the second convex teeth 2833 of the rotor gas valve mechanism 283, the rod gear 293 on the gas valve rod 29 opposite to the second inner cavity 222 is rotated, the third passage 291 of the gas valve rod 29 is in communication with the second inner cavity 222, and the second inner cavity 222 is filled with high pressure gas; at this time, the fourth passage 292 on the gas valve rod 29 opposite to the first inner cavity 221 is still in communication with the first inner cavity 221, and the gas within the first inner cavity 221 continues to be emitted into the low pressure air container 12; meanwhile, under the action of the first convex teeth 2832 of the rotor gas valve mechanism 283, the gas valve rod 29 opposite to the third inner cavity 223 is rotated to be in a closed state, and under the action of the gas pressure difference between the second inner cavity 222 and the first inner cavity 221, the two-arc rotor continues to rotate clockwise relative to the cylinder body 22. In the positional state F, the two-arc rotor is rotated relative to the cylinder body 22 to the 150° position; under the action of the first convex teeth 2832 of the rotor gas valve mechanism 283, the rod gear 293 on the gas valve rod 29 opposite to the third inner cavity 223 is rotated, the fourth passage 292 of the gas valve rod 29 is in communication with the third inner cavity 223, and the gas within the third inner cavity 223 can be emitted into the low pressure air container 12; at this time, the gas valve rod 29 opposite to the first inner cavity 221 is rotated under the driving of the second convex teeth 2833 to a closed state, and one of the curved outer walls 281 of the two-arc rotor enters the first inner cavity 221; meanwhile, the third passage 291 of the gas valve rod 29 opposite to the second inner cavity 222 is still in communication with the second inner cavity 222, the second inner cavity 222 continues to be filled with high pressure gas, and under the action of the gas pressure difference between the second inner cavity 222 and the third inner cavity 223, the two-arc rotor continues to rotate clockwise relative to the cylinder body 22 and finally returns to the positional state A. As a result, the two-arc rotor has been rotated 180° clockwise, each cylinder has completed a complete intake stroke or exhaust stroke; after the two-arc rotor has been rotated 360° clockwise, the three cylinders have completed two complete intake strokes and exhaust strokes, and each stroke can work on the rotation of the two-arc pistons.

Referring to FIGS. 1, 16 and 24, which is a working flow chart of a two-arc rotary piston pneumatic compressor, the work process of the two-arc rotary piston pneumatic compressor of the embodiment is just opposite to the work process of the two-arc rotary piston engine of the above embodiment shown in FIG. 16, and the specific work process will not be repeated here. The two-arc rotor 28 of the two-arc rotary piston pneumatic compressor of this embodiment is rotated counterclockwise relative to the cylinder body 22 under the driving of the rotary shaft 21 of the paired compress gas energy engine 2 to compress the low pressure gas within the low pressure air container 12 into the high pressure air container 11 such that a paired compress gas energy difference is formed between the low pressure air container 12 and the high pressure air container 11 and paired compress gas energy is formed within the paired compress gas energy storage device 1.

According to an embodiment of the invention, the power device 3 can be a generator, an elevator, a pneumatic tool, a vehicle, a ship or an aircraft. Among them, the paired compress gas energy engine can be, for example, a pneumatic machine or engine of an aircraft.

Figure 25:
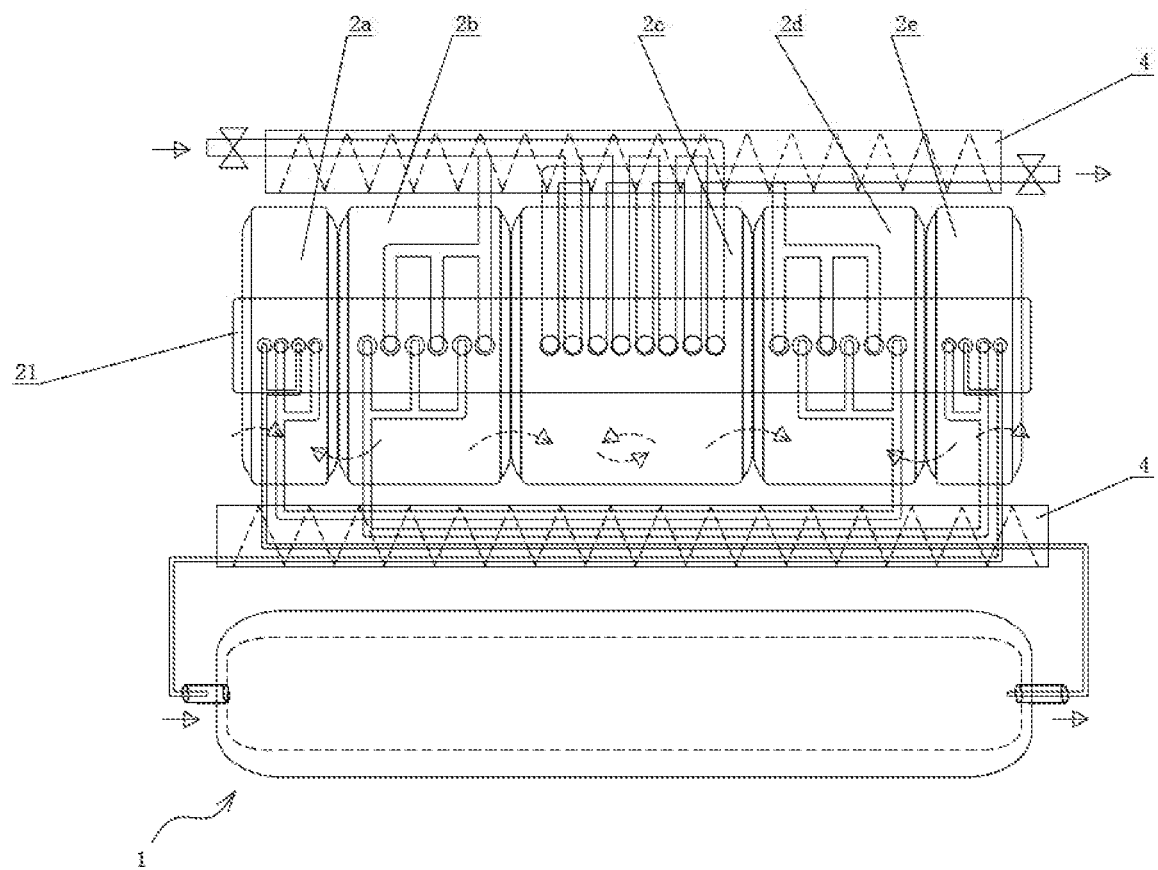
FIG. 25 is an instance of an application of the present invention to a paired compress gas energy storage system.

In a possible embodiment as shown in FIG. 25, the system includes five paired compress gas energy engines connected in series (a first paired compress gas energy engine 2a, a second paired compress gas energy engine 2b, a third paired compress gas energy engine 2c, a fourth paired compress gas energy engine 2d and a fifth paired compress gas energy engine 2e) and a paired compress gas energy storage device 1. Wherein, the paired compress gas energy storage device 1 is connected to the third paired compress gas energy engine 2c, and the third paired compress gas energy engine 2c may be a triangular rotary piston engine or a multi-arc rotary piston engine; the first paired compress gas energy engine 2a, the second paired compress gas energy engine 2b, the fourth paired compress gas energy engine 2d and the fifth paired compress gas energy engine 2e are respectively connected to the rotary shaft 21 of the third paired compress gas energy engine 2c.

In this embodiment, the rotary shaft 21 of the third paired compress gas energy engine 2c is rotated under the driving of the paired compress gas energy storage device 1, thereby driving the first paired compress gas energy engine 2a, the second paired compress gas energy engine 2b, the fourth paired compress gas energy engine 2d and the fifth paired compress gas energy engine 2e connected to the rotary shaft 21 to be activated, wherein the first paired compress gas energy engine 2a, the second paired compress gas energy engine 2b, the fourth paired compress gas energy engine 2d, and the fifth paired compress gas energy engine 2e may respectively be a triangular rotary piston pneumatic compressor or a multi-arc rotary piston pneumatic compressor. Mechanical torque energy is generated by the third paired compress gas energy engine 2c to drive the first paired compress gas energy engine 2a, the second paired compress gas energy engine 2b, the fourth paired compress gas energy engine 2d, and the fifth paired compress gas energy engine 2e to operate.

The paired compress gas energy gas source of the system is from the closed paired compress gas energy storage device 1, and is not in contact with the atmosphere of the external environment in almost any place. The space of the entire gas flow is limited and isovolumetric; during storage and pressurization, the respective paired compress gas energy engines are placed adjacent to each other, so that the heat generated by the respective paired compress gas energy engines in the process of acting as a gas compressor can be used as heat required to be absorbed in the engine process, and the heat energy is completely complementary to each other in total amount; the gas duct lines of two gas pressures are arranged side by side, and through the heat dissipation arrangement of a regenerator 4, the heat energy in the duct lines is completely complementary to each other in the total amount, without the need for additional thermal energy storage and recovery measures, reflecting the advantage of isothermal and isovolumetric compression and energy storage of the paired compress gas energy storage system.

Figure 26:
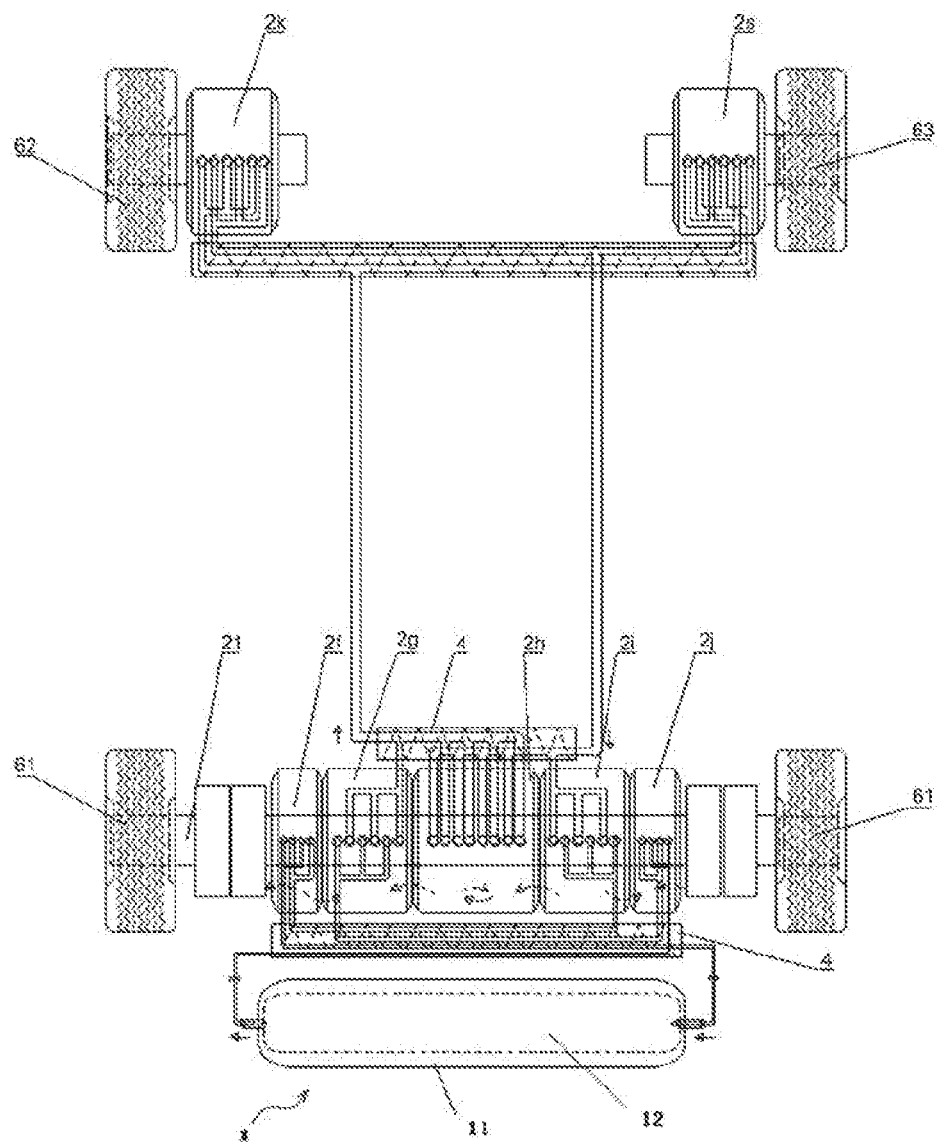
FIG. 26 is an instance of an application of the present invention to a paired compress gas energy vehicle.

In a possible embodiment as shown in FIG. 26, the system includes five paired compress gas energy engines connected in series, a sixth paired compress gas energy engine 2f, a seventh paired compress gas energy engine 2g, an eighth paired compress gas energy engine 2h, a ninth paired compress gas energy engine 2i and a tenth paired compress gas energy engine 2j, and a paired compress gas energy storage device 1. Wherein, the paired compress gas energy storage device 1 is connected to the eighth paired compress gas energy engine 2h, and the sixth paired compress gas energy engine 2f, the seventh paired compress gas energy engine 2g, the eighth paired compress gas energy engine 2h, the ninth paired compress gas energy engine 2i and the tenth paired compress gas energy engine 2j are all triangular rotary piston engines or multi-arc rotary piston engines, and are connected in series on the rotary shaft 21.

The system transports the high pressure gas within the high pressure air container 11 of the paired compress gas energy storage device 1 to the tenth paired compress gas energy engine 2j, the gas has a reduced pressure after the work and then is transported to the seventh paired compress gas energy engine 2g, after work, is again transported to the eighth paired compress gas energy engine 2h, after work, is again transported to the ninth paired compress gas energy engine 2i, and finally to the sixth paired compress gas energy engine 2f, and the gas emitted from the sixth paired compress gas energy engine 2f is transported into the low pressure air container 12 in the paired compress gas energy storage device 1. In the gas 12. During the work of the five paired compress gas energy engines, the rotary shaft 21 is rotated to drive the two first wheels 61 connected to both sides of the rotary shaft 21 to rotate.

Further, the eighth paired compress gas energy engine 2h is further in communication with the gas passages of the eleventh paired compress gas energy engine 2k and the twelfth paired compress gas energy engine 2s, so that the gas flowing through the eighth paired compress gas energy engine 2h is separately filled into the eleventh paired compress gas energy engine 2k and the twelfth paired compress gas energy engine 2s, to drive the second wheels 62 connected to the eleventh paired compress gas energy engine 2k and the third wheels 63 connected to the twelfth paired compress gas energy engine 2s to rotate. This process continues and is terminated until the pressure difference between the intensity of pressure of the gas within the high pressure air container 11 and the intensity of pressure of the gas within the low pressure air container 12 is zero.

From a thermodynamic point of view, this is an exchange process of heat, work, and energy. In order to make the system have higher work efficiency, by releasing step by step the high pressure gas and the low pressure gas within the paired compress gas energy storage device 1 according to an isometric pressure difference to work on the paired compress gas energy engine, the generated mechanical energy drives the wheels to rotate, the exchange process of heat, work and energy in the release of gas energy is based on the isothermal and isovolumetric pressure reduction process, which can achieve higher exchange efficiency.

The gas source of the system is from the closed paired compress gas energy storage device 1, and is not in contact with the atmosphere of the external environment in almost any place. The space of the entire gas flow is limited and isometric; in the work of releasing gas energy, the respective paired compress gas energy engines are arranged adjacent to each other, and the heat energy is mutually complementary in the total amount; the duct lines of the two gas pressures are arranged side by side, and the heat energy in the duct lines is naturally and mutually complementary in the total amount through the heat dissipation arrangement of the regenerator 4, without the need for additional thermal energy storage and recovery measures, reflecting the advantages of isothermal and isovolumetric release and working of the paired compress gas energy kinetic energy system.

Figure 27:
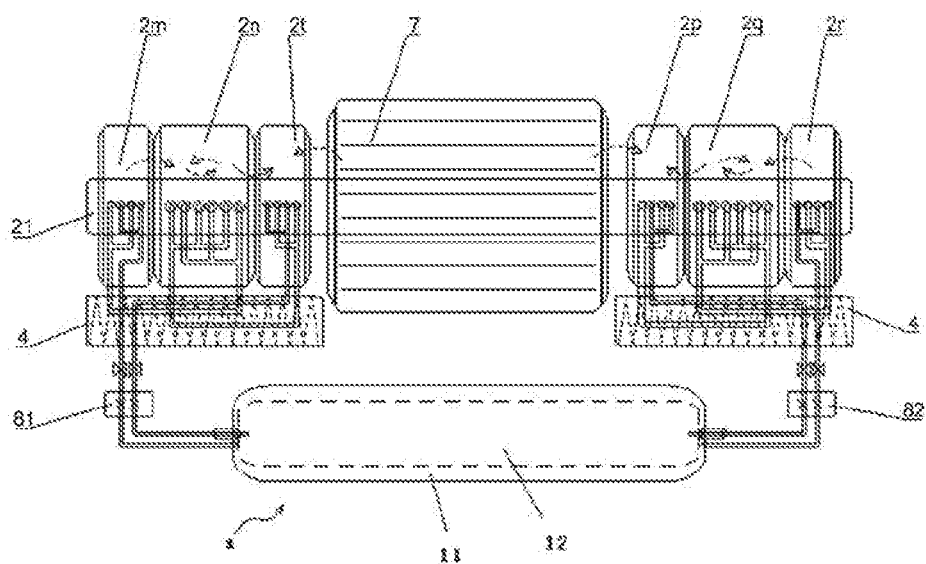
FIG. 27 is an instance of an application of the present invention to a paired compress gas energy storage power plant.

In a possible embodiment as shown in FIG. 27, the system is an embodiment of a power grid energy storage power station, and is a system for exchanging paired compress gas energy in the paired compress gas energy storage device 1 with the grid power, and from the viewpoint of thermodynamics, the system is a process of exchange of heat, electricity, and paired compress gas energy. In order to make the system have a higher exchange efficiency, the pressure decrease or increase orders are arranged by an isometric pressure difference for the high pressure gas and the low pressure gas within the paired compress gas energy storage device 1. During the storage of electrical energy, the paired compress gas energy is pressurized step by step into the paired compress gas energy storage device 1. During the recovery of electrical energy, the paired compress gas energy is gradually decompressurized from the paired compress gas energy storage device 1 step by step and releases electric energy. In the pressure pressurization and release of the paired compress gas energy, the exchange process of heat, electricity and paired compress gas energy is based on the isothermal and isovolumetric pressure reduction process, and a higher exchange efficiency can be obtained.

The electric energy storage condition process of the power grid is as follows: the synchronous engine 7 connected to the power grid is configured to be in a synchronous engine operating mode, and the electrical energy of the power grid is converted into the mechanical torque energy, thereby driving a thirteenth paired compress gas energy engine 2m, a fourteenth paired compress gas energy engine 2n, a fifteenth paired compress gas energy engine 2t, a sixteenth paired compress gas energy engine 2p, a seventeenth paired compress gas energy engine 2q and an eighteenth paired compress gas energy engine 2r on the rotary shaft 21, where the thirteenth paired compress gas energy engine 2m, the fourteenth paired compress gas energy engine 2n, the fifteenth paired compress gas energy engine 2t, the sixteenth paired compress gas energy engine 2p, the seventeenth paired compress gas energy engine 2q and the eighteenth paired compress gas energy engine 2r are respectively a triangular rotary piston pneumatic compressor or a multi-arc rotary piston pneumatic compressor, and at this time, an first exchange valve 81 and an second exchange valve 82 are configured to be in a gas compressor delivery mode. The low pressure gas within the low pressure air container of the paired compress gas energy storage device 1 enters in one path firstly the fifteenth paired compress gas energy engine 2t through the first exchange valve 81, then the pressurized gas enters the fourteenth paired compress gas energy engine 2n, and the re-pressurized gas enters the thirteenth paired compress gas energy engine 2m, and the finally pressurized gas is delivered into the high pressure air container 11 of the paired compress gas energy storage device 1 through the first exchange valve 81, and in the other path enters the sixteenth paired compress gas energy engine 2p through the second exchange valve 82, the pressurized gas then enters the seventeenth paired compress gas energy engine 2q, the re-pressurized gas enters the eighteenth paired compress gas energy engine 2r, and the finally pressurized gas is delivered into the high pressure air container 11 of the paired compress gas energy storage device 1 through the second exchange valve 82. The development of this process makes the gas energy pressure difference within the paired compress gas energy storage device 1 gradually increase after six stages of pressurization, that is, the amount of the paired compress gas energy increases, which means that the electric energy is converted into a form of paired compress gas energy and stored gradually.

The electric energy recovery condition process of the power grid is as follows: the synchronous engine 7 connected to the power grid is configured to be in a synchronous engine operating mode, wherein the thirteenth paired compress gas energy engine 2m, the fourteenth paired compress gas energy engine 2n, the fifteenth paired compress gas energy engine 2t, the sixteenth paired compress gas energy engine 2p, the seventeenth paired compress gas energy engine 2q and the eighteenth paired compress gas energy engine 2r are respectively a triangular rotary piston gas engine or a multi-arc rotary piston gas engine, and at this time, the first exchange valve 81 and the second exchange valve 82 are configured to be in an engine gas delivery mode. The high pressure gas within the high pressure air container 11 of the paired compress gas energy storage device 1 enters in one path firstly the thirteenth paired compress gas energy engine 2m through the first exchange valve 81, then the de-pressurized gas enters the fourteenth paired compress gas energy engine 2n, and the re-depressurized gas enters the fifteenth paired compress gas energy engine 2t, and the finally de-pressurized gas is delivered into the low pressure air container 12 of the paired compress gas energy storage device 1 through the first exchange valve 81, and in the other path enters the eighteenth paired compress gas energy engine 2r through the second exchange valve 82, the de-pressurized gas then enters the seventeenth paired compress gas energy engine 2q, the re-depressurized gas enters the sixteenth paired compress gas energy engine 2p, and the finally de-pressurized gas is delivered into the low pressure air container 12 of the paired compress gas energy storage device 1 through the second exchange valve 82. The six paired compress gas energy engines drive the rotary shaft 21 to rotate and further drive the engine 7 to supply power to the power grid. The development of this process makes the gas energy pressure difference within the paired compress gas energy storage device 1 gradually decrease, which means that the paired compress gas energy is converted into a form of electric energy and recovered gradually.

The gas source of the system is from the closed paired compress gas energy storage device 1, and is not in contact with the atmosphere of the external environment in almost any place. The space of the entire gas flow is limited and isometric; in the work of releasing gas energy, the respective paired compress gas energy engines are arranged adjacent to each other, and the heat energy is mutually complementary in the total amount; the duct lines of the two gas pressures are arranged side by side, and the heat energy in the duct lines is naturally and mutually complementary in the total amount through the heat dissipation arrangement of the regenerator 4, without the need for additional thermal energy storage and recovery measures, reflecting the efficiency and advantages of the way of exchange between gas energy and electric energy of the isothermal and isovolumetric structure of the paired compress gas energy kinetic energy system.

As shown in FIG. 1 to FIG. 27, the present invention also provides a paired compress gas energy method, including the steps of: providing a high pressure air container 11 filled with a high pressure gas and a low pressure air container 12 filled with a low pressure gas, there being paired compress gas energy between the low pressure air container 12 and the high pressure air container 11, specifically, during the process of the high pressure gas within the high pressure air container 11 flowing into the low pressure air container 12 to become low pressure gas, driving an external power device 3, and under the action of an external force, the external power device 3 compressing the low pressure gas within the low pressure air container 12 to become high pressure gas, to implement the release of the paired compress gas energy in an isothermal and isovolumetric thermal cycle work mode to drive the external power device 3.

Wherein, the release of the paired compress gas energy in an isothermal and isovolumetric thermal cycle work mode can be achieved by means of a paired compress gas energy engine 2, and the rotary shaft of the paired compress gas energy engine is connected to the power device.

The paired compress gas energy power method of the embodiment is implemented by the paired compress gas energy power system of the present invention. The structure, working principle and beneficial effects of the paired compress gas energy power system have been described in detail above, and will not be described herein.

It should be noted that the above embodiments are merely illustrative of the technical solutions of the present invention and are not intended to be limiting, although the present invention has been described in detail with reference to the preferred embodiments. Those of ordinary skill in the art shall appreciate that any modification and equivalent substitution to the technical solutions of the present invention without departing from the spirit and principle of the invention shall be included within the scope of protection of the invention.

What is claimed is:

1. A paired compress gas energy power system, comprising:
   a paired compress gas energy storage device, wherein the paired compress gas energy storage device is provided with a high pressure gas container and a low pressure gas container; the high pressure gas container is filled with a high pressure gas; the low pressure gas container is filled with a low pressure gas;
   a paired compress gas energy engine, wherein the paired compress gas energy engine is connected to the low pressure gas container and the high pressure gas container, respectively; the high pressure gas within the high pressure gas container flows through the paired compress gas energy engine into the low pressure gas container so as to drive a rotary shaft of the paired compress gas energy engine to rotate forwardly;
   a power device, wherein the power device is connected to the rotary shaft of the paired compress gas energy engine; the power device is driven by the paired compress gas energy engine through the rotary shaft; the power device drives the rotary shaft and the paired compress gas energy engine to rotate reversely under the action of an external force, such that the low pressure gas within the low pressure gas container flows through the paired compress gas energy engine and is compressed into the high pressure gas container to be the high pressure gas; and
   a regenerator, wherein the regenerator is connected between the paired compress gas energy engine and the paired compress gas energy storage device; and the regenerator is used for performing thermal energy exchange of gas flowing out of the high pressure gas container and gas flowing into the low pressure gas container.

2. The paired compress gas energy power system according to claim 1, wherein the paired compress gas energy storage device comprises an inner body and an outer body sleeved outside the inner body; the inner body is the high pressure gas container; and a cavity formed between the outer body and the inner body is the low pressure gas container; or the inner body is the low pressure gas container; and the cavity formed between the outer body and the inner body is the high pressure gas container.

3. The paired compress gas energy power system according to claim 1, wherein a paired compress gas energy differential rotor stabilizer valve is further provided between the regenerator and the paired compress gas energy storage device; and the paired compress gas energy differential rotor stabilizer valve is used for enabling the pressure difference of the gas flowing through the paired compress gas energy engine to maintain stable.

4. The paired compress gas energy power system according to claim 3, wherein the paired compress gas energy differential rotor stabilizer valve comprises:
   a first duct, wherein one end of the first duct connected to the high pressure gas container is a first duct intake end; the other end of the first duct connected to the paired compress gas energy engine is a first duct exhaust end; a first rotor gas valve is rotatably provided at the first duct intake end; and the first rotor gas valve has a first rotor gas valve passage;
   a second duct, wherein one end of the second duct connected to the low pressure gas container is a second duct exhaust end; the other end of the second duct connected to the paired compress gas energy engine is a second duct intake end; a second rotor gas valve is rotatably provided at the second duct exhaust end; and the second rotor gas valve has a second rotor gas valve passage;
   a differential cylinder, wherein the differential cylinder is connected between the first duct exhaust end and the second duct intake end; a movable differential piston is provided within the differential cylinder; and the differential cylinder is divided into a first cylinder and a second cylinder through the differential piston; the first cylinder is communicated with the first duct; and the second cylinder is communicated with the second duct; and
   a linkage mechanism, wherein the linkage mechanism is connected to the differential piston; a movement of the differential piston drives the first rotor gas valve and the second rotor gas valve to rotate through the linkage mechanism; the second rotor gas valve passage is in communication with the second duct in a state that the first rotor gas valve passage is in communication with the first duct; the paired compress gas energy differential rotor stabilizer valve further comprises a driving mechanism; and the driving mechanism drives the differential piston to move within the differential cylinder.

5. The paired compress gas energy power system according to claim 4, wherein the driving mechanism comprises a connecting rod and a spring; one end of the connecting rod is connected to the spring; and the other end of the connecting rod is connected to the differential piston; the linkage mechanism comprises a first linkage rod and a second linkage rod; both ends of the first linkage rod are rotatably connected to the connecting rod and the first rotor gas valve, respectively; and both ends of the second linkage rod are rotatably connected to the connecting rod and the second rotor gas valve, respectively.

6. The paired compress gas energy power system according to claim 4, wherein the driving mechanism comprises a driving gear and two driven gears respectively engaging with the driving gear; the two driven gears are connected to the first rotor gas valve and the second rotor gas valve, respectively; and a torsion spring is provided in the driving gear; the linkage mechanism comprises a first linkage rod and a second linkage rod; both ends of the first linkage rod are rotatably connected to the first rotor gas valve and the differential piston, respectively; and both ends of the second linkage rod are rotatably connected to the second rotor gas valve and the differential piston, respectively.

7. The paired compress gas energy power system according to claim 1, wherein the paired compress gas energy engine is provided with a cylinder body and a rotatable triangular rotary piston provided within the cylinder body; the triangular rotary piston has a triangular cross section; and the cylinder body is provided with a plurality of gas ports for gas intake and exhaust connected to the paired compress gas energy storage device.

8. The paired compress gas energy power system according to claim 7, wherein the paired compress gas energy engine is further provided with a power gear shaft; the power gear shaft is provided within the triangular rotary piston; an inner peripheral wall of the triangular rotary piston is provided with engaging convex teeth that cooperate with the power gear shaft; and the rotary shaft of the paired compress gas energy engine is connected to the power gear shaft; the triangular rotary piston is provided with a first end angle, a second end angle and a third end angle in rolling contact with an inner wall of the cylinder body; the cylinder body is split into a first inner cavity, a second inner cavity and a third inner cavity by the first end angle, the second end angle and the third end angle; the inner cavity of the cylinder body between the first end angle and the second end angle is the first inner cavity; the inner cavity of the cylinder body between the second end angle and the third end angle is the second inner cavity; and the inner cavity of the cylinder body between the third end angle and the first end angle is the third inner cavity; the plurality of gas ports for gas inlets and outlets on the cylinder body include two first gas ports and two second gas ports; one of the first gas ports and one of the second gas ports are provided on a first side of the cylinder body, the other one of the first gas ports and the other one of the second gas ports are provided on a second side of the cylinder body opposite to the first side of the cylinder body; the first gas port located on the first side of the cylinder body is provided opposite to the second gas port on the second side of the cylinder body, and the second gas port located on the first side of the cylinder body is provided opposite to the first gas port on the second side of the cylinder body.

9. The paired compress gas energy power system according to claim 8, wherein the first gas ports are connected to the high pressure gas container; the second gas ports are connected to the low pressure gas container; in a state that the first gas ports are respectively in communication with the first inner cavity, the second inner cavity or the third inner cavity, the triangular rotary piston is rotated relative to the cylinder body under the pushing of the high pressure gas flowing into the first gas ports; in a state that the second gas ports are respectively in communication with the first inner cavity, the second inner cavity or the third inner cavity, the rotation of the triangular rotary piston enables the gas within the first inner cavity, the gas within the second inner cavity or the gas within the third inner cavity to be emitted out of the second gas ports.

10. The paired compress gas energy power system according to claim 8, wherein the first gas ports are connected to the low pressure gas container; the second gas ports are connected to the high pressure gas container; the rotation of the triangular rotary piston enables the low pressure gas within the low pressure gas container to flow into the first inner cavity, the second inner cavity or the third inner cavity through the first gas ports, respectively; and the low pressure gas within the first inner cavity, the low pressure gas within the second inner cavity or the low pressure gas within the third inner cavity is compressed into the high pressure gas container respectively through the second gas ports.

11. The paired compress gas energy power system according to claim 8, wherein two roller bars are provided at each of three contacting points of the first end angle, the second end angle and the third end angle of the triangular rotary piston and the cylinder body; the two roller bars are respectively an inner roller bar and an outer roller bar; and the outer roller bar is rollably provided between the inner roller bar and an inner wall of the cylinder body.

12. The paired compress gas energy power system according to claim 1, wherein the paired compress gas energy engine is provided with a rotatable cylinder body and a triangular piston provided within the cylinder body; the triangular piston has a triangular cross section; the triangular piston is provided with a third gas port and a fourth gas port connected to the paired compress gas energy storage device; and an inner cavity of the triangular piston is connected to an inner cavity of the cylinder body; the rotary shaft of the paired compress gas energy engine is connected to the cylinder body; the inner cavity of the triangular piston comprises a first piston inner cavity and a second piston inner cavity; the first piston inner cavity is in communication with the third gas port; and the second piston inner cavity is in communication with the fourth gas port; the triangular piston is provided with a first end angle, a second end angle, and a third end angle in rolling contact with an inner wall of the cylinder body; the cylinder body is split into a first inner cavity, a second inner cavity and a third inner cavity through the first end angle, the second end angle and the third end angle; the inner cavity of the cylinder body between the first end angle and the second end angle is the first inner cavity; the inner cavity of the cylinder body between the second end angle and the third end angle is the second inner cavity; the inner cavity of the cylinder body between the third end angle and the first end angle is the third inner cavity; the triangular piston is provided with a first gas delivery piston rod, a second gas delivery piston rod and a third gas delivery piston rod; the first gas delivery piston rod is provided opposite to the first inner cavity; the second gas delivery piston rod is provided opposite to the second inner cavity; and the third gas delivery piston rod is provided opposite to the third inner cavity; the first gas delivery piston rod, the second gas delivery piston rod and the third gas delivery piston rod are all axially rotatably provided on the triangular piston; each of the piston rods is provided with a plurality of radial first passages which are spaced in parallel with each other along an axial direction of the piston rod; a second passage is provided between the two adjacent first passages; an angle is provided between the second passage and the first passage; the first piston inner cavity is in communication with the first inner cavity, the second inner cavity or the third inner cavity through the plurality of first passages, respectively; and the second piston inner cavity is in communication with the first inner cavity, the second inner cavity or the third inner cavity through the plurality of second passages, respectively; the first passages and the second passages are provided perpendicular to each other; on an axial center of the cylinder shaft is provided with a gear shaft; and opposite sides of the inner wall of the cylinder body are respectively provided with inner convex teeth; the piston rod is provided with transmission teeth; and the transmission teeth cooperate with the gear shaft and the inner convex teeth in a transmission manner.

13. The paired compress gas energy power system according to claim 12, wherein the third gas port is connected to the high pressure gas container; the fourth gas port is connected to the low pressure gas container; in a state that the third gas port is in communication with the first inner cavity, the second inner cavity or the third inner cavity respectively, the high pressure gas introduced from the third gas port flows into the first inner cavity, the second inner cavity or the third inner cavity respectively, and the cylinder body is rotated relative to the triangular piston under the pushing of the high pressure gas; in a state that the fourth gas port is in communication with the first inner cavity, the second inner cavity or the third inner cavity respectively, the rotation of the cylinder body enables the gas within the first inner cavity, the gas within the second inner cavity or the gas within the third inner cavity to be emitted out of the fourth gas port, respectively.

14. The paired compress gas energy power system according to claim 12, wherein the third gas port is connected to the low pressure gas container, the fourth gas port is connected to the high pressure gas container, the rotation of the cylinder body enables the low pressure gas within the low pressure gas container to flow into the first inner cavity, the second inner cavity or the third inner cavity through the third gas port, respectively; and in a state that the first inner cavity, the second inner cavity or the third inner cavity is respectively in communication with the fourth gas port, the gas within the first inner cavity, the gas within the second inner cavity, or the gas within the third inner cavity is compressed into the high pressure gas container through the fourth gas port, respectively.

15. The paired compress gas energy power system according to claim 1, wherein the paired compress gas energy engine is provided with a cylinder body and a multi-arc rotor rotatably provided within the cylinder body; the multi-arc rotor is provided with a plurality of arcuate outer walls provided in a circumferential direction; the cylinder body is provided with a plurality of arcuate inner walls provided in a circumferential direction; the arcuate outer walls cooperate with the arcuate inner walls; the cylinder body is provided with a plurality of gas ports for gas intake and exhaust connected to the paired compress gas energy storage device; the number of the curved outer walls is 2; the number of the curved inner walls is 3; the number of the gas ports is 3; the paired compress gas energy engine is further provided with a power gear shaft; the power gear shaft is provided within the multi-arc rotor; the inner peripheral wall of the multi-arc rotor is provided with engaging convex teeth that cooperate with the power gear shaft; and the rotary shaft of the paired compress gas energy engine is connected to the power gear shaft; the cylinder body is split into a first inner cavity, a second inner cavity and a third inner cavity by the multi-arc rotor; the plurality of gas ports for gas intake and exhaust on the cylinder body are in communication with the first inner cavity, the second inner cavity or the third inner cavity, respectively; each of the gas ports comprises a plurality of third passages and a plurality of fourth passages.

16. The paired compress gas energy power system according to claim 15, wherein the third passages are connected to the high pressure gas container; the fourth passages are connected to the low pressure gas container; a valve rod is rotatably provided within the gas port; the valve rod is provided with a plurality of the third passages which are spaced in parallel with each other in an axial direction of the valve rod; one of the fourth passages is provided between the two adjacent third passages; and an angle is provided between the third passages and the fourth passages; the multi-arc rotor is connected to a rotor gas valve mechanism for opening or closing the plurality of third passages and the plurality of fourth passages of each of the gas ports for gas intake and exhaust; the rotor gas valve mechanism comprises a valve swivel; the valve swivel is provided with a plurality of first convex teeth and a plurality of second convex teeth along a circumferential direction thereof; one of the first convex teeth is provided between the two adjacent second convex teeth; a tooth length of the first convex teeth is longer than a tooth length of the second convex teeth; a rod gear is connected to the gas valve rod; the second convex teeth and the first convex teeth are respectively driven and connected to the rod gear; and the number of the first convex teeth and the number of the second convex teeth are 3, respectively.

17. The paired compress gas energy power system according to claim 15, wherein the third passages are connected to the low pressure gas container; the fourth passages are connected to the high pressure gas container; the fourth passage is provided between the two adjacent third passages; the plurality of third passages and the plurality of fourth passages are provided in parallel with each other; a first one-way valves are provided within the third passages; and a second one-way valves are provided within the fourth passages.

18. The paired compress gas energy power system according to claim 1, wherein the power device is a generator, an elevator, a pneumatic tool, a vehicle, a ship or an aircraft.

19. A paired compress gas energy power method, wherein the method comprises the steps of:
providing a high pressure gas container filled with a high pressure gas and a low pressure gas container filled with a low pressure gas, wherein the high pressure gas container and the low pressure gas container form a paired compress gas energy storage device;
driving a rotary shaft of paired compress gas energy engine to rotate forwardly in a process of the high pressure gas within the high pressure gas container flowing through the paired compress gas energy engine into the low pressure gas container to be the low pressure gas, wherein the paired compress gas energy engine is connected to the low pressure gas container and the high pressure gas container, respectively; and
driving the rotary shaft and the paired compress gas energy engine to rotate reversely under the action of an external force by a power device, such that the low pressure gas within the low pressure gas container flows through the paired compress gas energy engine and is compressed into the high pressure gas container to be the high pressure gas, wherein the power device is connected to the rotary shaft of the paired compress gas energy engine, and the power device is driven by the paired compress gas energy engine through the rotary shaft;

wherein, a regenerator is connected between the paired compress gas energy engine and the paired compress gas energy storage device, and the regenerator is used for performing thermal energy exchange of a gas flowing out of the high pressure a gas container and gas flowing into the low pressure gas container.

* * * * *